US012633440B2

(12) United States Patent
Oie et al.

(10) Patent No.: US 12,633,440 B2
(45) Date of Patent: May 19, 2026

(54) ELECTRONIC COMPONENT

(71) Applicant: Murata Manufacturing Co., Ltd., Kyoto (JP)

(72) Inventors: Hirofumi Oie, Nagaokakyo (JP); Masahiro Teramoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 198 days.

(21) Appl. No.: 18/608,068

(22) Filed: Mar. 18, 2024

(65) Prior Publication Data

US 2024/0222009 A1 Jul. 4, 2024

Related U.S. Application Data

(63) Continuation of application No. PCT/JP2022/035326, filed on Sep. 22, 2022.

(30) Foreign Application Priority Data

Sep. 24, 2021 (JP) ................................. 2021-156005

(51) Int. Cl.
*H01F 17/00* (2006.01)
*H01F 27/36* (2006.01)
(Continued)

(52) U.S. Cl.
CPC ......... *H01F 17/0013* (2013.01); *H01F 27/36* (2013.01); *H01G 2/22* (2013.01); *H01G 4/40* (2013.01)

(58) Field of Classification Search
None
See application file for complete search history.

(56) References Cited

U.S. PATENT DOCUMENTS 6,444,066 B1* 9/2002 Sugimoto ................ H01G 4/40
264/619
2017/0092414 A1* 3/2017 Ishikawa ............. H01F 27/2804
(Continued)

FOREIGN PATENT DOCUMENTS

JP 2004-031833 A 1/2004
JP 2004-303946 A 10/2004
(Continued)

OTHER PUBLICATIONS

International Search Report for PCT/JP2022/035326 dated Dec. 20, 2022.

*Primary Examiner* — Krystal Robinson
(74) *Attorney, Agent, or Firm* — McDonald Hopkins LLC

(57) ABSTRACT

To provide an electronic component capable of improving the visibility of an identification mark, while maintaining the strength of a substrate body. An electronic component includes substrate body that includes a plurality of insulating substrates laminated in thickness direction and that has a pair of principal surfaces and side surface, LC resonator that includes inductor conductor disposed on at least one of the plurality of substrates, and capacitor conductor disposed on at least one of the plurality of substrates and electrically connected to inductor conductor, shield conductor that is disposed on principal surface and that is electrically connected to ground, and identification mark that is provided on surface of shield conductor.

20 Claims, 19 Drawing Sheets

(51) Int. Cl.
   *H01G 2/22*            (2006.01)
   *H01G 4/40*            (2006.01)

(56)                References Cited

U.S. PATENT DOCUMENTS

| | | | | |
|---|---|---|---|---|
| 2017/0110240 A1* | 4/2017 | Masuda | .................. | H01F 27/34 |
| 2017/0200554 A1* | 7/2017 | Kudo | ..................... | H01F 27/36 |
| 2018/0315545 A1 | 11/2018 | Kusumoto et al. | | |
| 2019/0198230 A1 | 6/2019 | Miyahara et al. | | |
| 2019/0199310 A1 | 6/2019 | Sato et al. | | |
| 2020/0082990 A1 | 3/2020 | Yamamoto et al. | | |
| 2021/0098183 A1* | 4/2021 | Araki | .................. | H01F 41/127 |
| 2023/0188110 A1* | 6/2023 | Taniguchi | ............ | H03H 7/0115 |
| | | | | 333/185 |

FOREIGN PATENT DOCUMENTS

| | | | |
|---|---|---|---|
| JP | 2018-186205 A | 11/2018 |
| JP | 2019-114670 A | 7/2019 |
| JP | 6863458 B2 | 4/2021 |
| WO | 2018/047488 A1 | 3/2018 |

* cited by examiner

Fig. 16

ELECTRONIC COMPONENT

CROSS REFERENCE TO RELATED APPLICATION

This is a continuation of International Application No. PCT/JP2022/035326 filed on Sep. 22, 2022 which claims priority from Japanese Patent Application No. 2021-156005 filed on Sep. 24, 2021. The contents of these applications are incorporated herein by reference in their entireties.

BACKGROUND OF THE DISCLOSURE

Field of the Disclosure

The present disclosure relates to an electronic component including a substrate body and an identification mark formed on an outer surface of the substrate body.

Description of the Related Art

An electronic component including an identification mark is disclosed in Patent Documents 1 and 2.

In a laminated electronic component disclosed in Patent Document 1, a laminate that is a lamination of a plurality of dielectric layers is provided with a mark layer and a shield covering the mark layer. The mark layer includes a conductor layer disposed on the top surface of the uppermost dielectric layer.

In the laminated electronic component disclosed in Patent Document 2, a recess is formed on the top surface of a laminate that is a lamination of a plurality of ceramic layers. On the top surface having the recess, a shield layer is provided. This recess serves as an identification mark.

Patent Document 1: JP-A-2018-186205
Patent Document 2: JP-B2-6863458

BRIEF SUMMARY OF THE DISCLOSURE

In the laminated electronic component disclosed in Patent Document 1, the shield covering the mark layer obscures the visibility of the mark layer.

In the laminated electronic component disclosed in Patent Document 1, the mark layer is placed on the laminate. At this time, depending on the compatibility between the material of the laminate and the material of the mark layer, the following problems may arise. For example, when the materials of the laminate and the mark layer are both ceramics, diffusion may occur between the ceramics. Such diffusion may lead to a deterioration of the dielectric characteristics of the laminate. Therefore, in the configuration in which the mark layer is disposed on the laminate, only limited materials can be used suitably for the mark layer.

In the laminated electronic component disclosed in Patent Document 2, in order to improve the visibility of the identification mark, it is necessary to increase the depth of the recess serving as an identification mark, or to increase the area of the recess in a plan view. In other words, it is necessary to increase the volume of the recess. If the volume of the recess is increased, however, the internal space for providing the internal circuit inside the laminate is reduced. Furthermore, if the volume of the recess is increased, the laminate becomes more vulnerable to cracking, and becomes less shock-resistant.

Therefore, a possible benefit of the present disclosure is to solve the problems described above, and to provide an electronic component capable of improving the visibility of an identification mark, while maintaining the strength of a substrate body.

In order to achieve the possible benefit described above, the present disclosure is configured as follows. An electronic component according to one aspect of the present disclosure includes: a substrate body that includes a plurality of insulating substrates laminated in a thickness direction and that has a pair of principal surfaces facing each other and a side surface connecting the pair of principal surfaces; an LC resonator that includes an inductor conductor disposed on at least one of the plurality of substrates, and a capacitor conductor disposed on at least one of the plurality of substrates and electrically connected to the inductor conductor; a shield conductor that is disposed on at least one principal surface, among the pair of principal surfaces and the side surface, and that is electrically connected to a ground; and an identification mark that is provided on a surface of the shield conductor disposed on the one principal surface, among the pair of principal surfaces.

According to the present disclosure, it is possible to improve the visibility of the identification mark while maintaining the strength of the substrate body.

BRIEF DESCRIPTION OF THE SEVERAL VIEWS OF THE DRAWINGS

FIG. 16 is a cross-sectional view when an identification mark is printed on the shield conductor, in the process of manufacturing the electronic component according to a third embodiment of the present disclosure.

DETAILED DESCRIPTION OF THE DISCLOSURE

Figure 1:
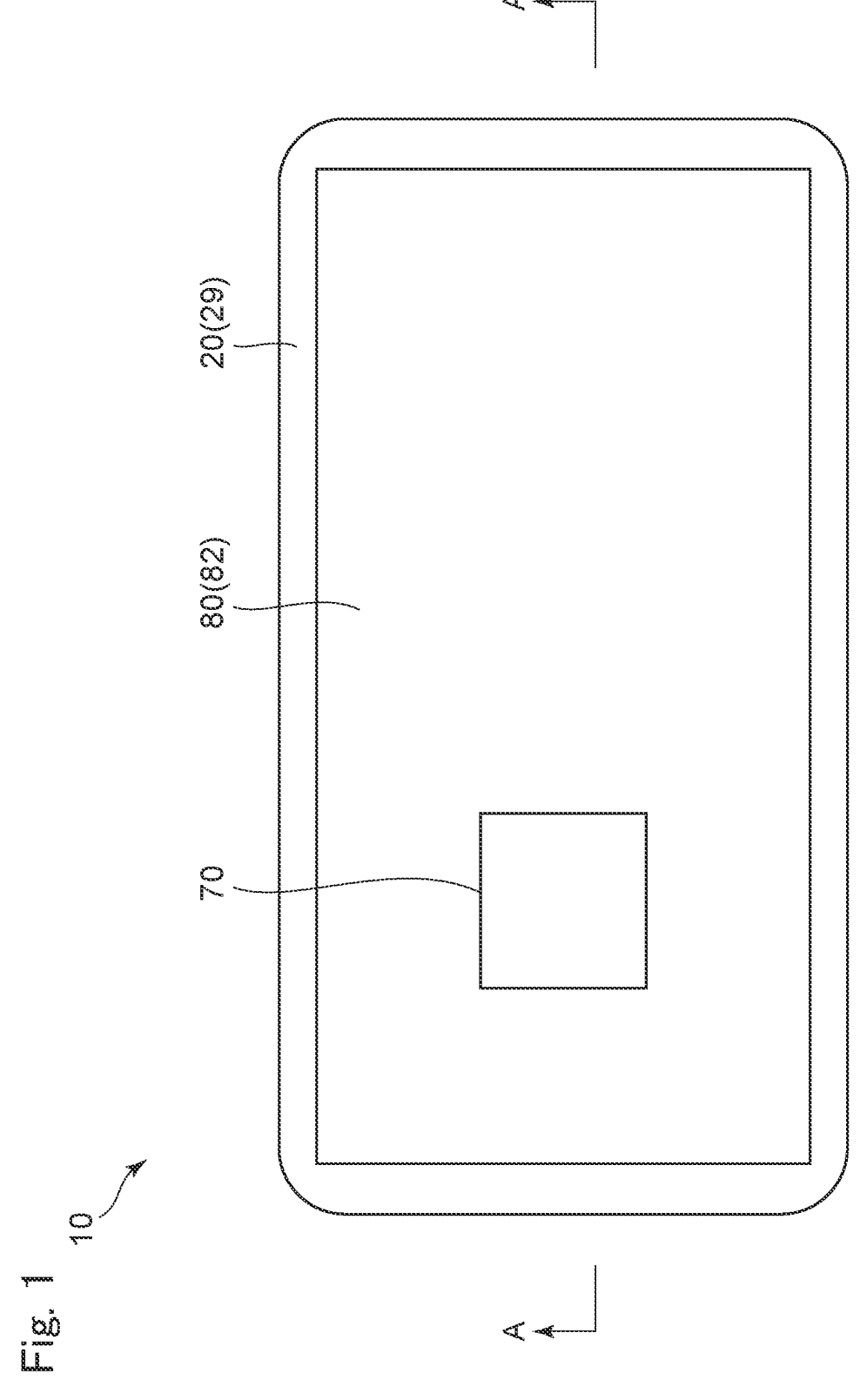
FIG. 1 is a plan view of an electronic component according to a first embodiment of the present disclosure.

An electronic component according to one aspect of the present disclosure includes: a substrate body that includes a plurality of insulating substrates laminated in a thickness direction and that has a pair of principal surfaces facing each other and a side surface connecting the pair of principal surfaces; an LC resonator that includes an inductor conductor disposed on at least one of the plurality of substrates, and a capacitor conductor disposed on at least one of the plurality of substrates and electrically connected to the inductor conductor; a shield conductor that is disposed on at least one principal surface, among the pair of principal surfaces and the side surface, and that is electrically connected to a ground; and an identification mark that is provided on a surface of the shield conductor disposed on the one principal surface, among the pair of principal surfaces.

In this configuration, the identification mark is provided on the surface of the shield conductor. Therefore, the visibility of the identification mark can be improved, compared with a configuration in which the identification mark is covered by the shield conductor.

In this configuration, the shield conductor is interposed between the identification mark and the substrate body. Therefore, even when both the identification mark and the substrate body are ceramics, it is possible to prevent diffusion of the ceramics.

In this configuration, there is no recess by which the identification mark is formed, on the outer surface of the substrate body. Therefore, the strength of the substrate body can be ensured, compared with the configuration having a recess.

In this configuration, in a process of manufacturing the electronic component, as a stack of substrates is laminated, the identification mark presses the shield conductor into the substrate. As a result, adhesiveness between the shield conductor and the substrate body can be improved.

In this configuration, the electronic component includes an LC resonator. The shield conductor is provided on at least one principal surface of the pair of principal surfaces, among the outer surfaces of the substrate body. Therefore, it is possible to achieve an electronic component in which at least one of the other principal surface of the pair of principal surfaces and the side surfaces does not have any shield conductor. With this, less magnetic flux from the LC resonator is shielded by the shield conductor.

In the electronic component, a substrate having the shield conductor, among the plurality of substrates, may be provided with an interlayer-connection conductor penetrating the substrate, and the shield conductor may be electrically connected to a ground via the interlayer-connection conductor.

In a conventional configuration, for example, an internal electrode on a principal surface of a substrate located internal of the substrate body is electrically connected to a shield conductor provided on a side surface of the substrate body, on the side edge of the substrate. In this configuration, the thickness of the internal electrode determines the area by which the internal electrode is brought into contact with the shield conductor. It is however difficult to increase the thickness of the internal electrode. It is therefore difficult to increase the area by which the internal electrode is brought into contact with the shield conductor.

By contrast, in the present configuration, the interlayer-connection conductor provided internal of the substrate is electrically connected to the shield conductor. In this configuration, the diameter of a via filled with the interlayer-connection conductor internal of the substrate determines the area by which the interlayer-connection conductor is brought into contact with the shield conductor. Compared with increasing the thickness of the internal electrode, it is easier to increase the diameter of the via. It is therefore easier to increase the area by which the interlayer-connection conductor is brought into contact with the shield conductor, than to increase the area by which the internal electrode is brought into contact with the shield conductor. Therefore, the reliability of the connection between the interlayer-connection conductor and the shield conductor can be improved.

In the electronic component, the substrate provided with the shield conductor, among the plurality of substrates, may be provided with a plurality of the interlayer-connection conductors, and the shield conductor may be electrically connected to a ground via the plurality of the interlayer-connection conductors.

In this configuration, it is possible to electrically connect a larger number of the interlayer-connection conductors to the shield conductor. By electrically connecting a larger number of interlayer-connection conductors to the shield conductor, unnecessary resonance in the LC resonator can be suppressed.

In the electronic component, the identification mark may be provided at a position offset from the interlayer-connection conductor, in a view from the thickness direction.

If the identification mark is provided at a position overlapping with the interlayer-connection conductor in a view from the thickness direction, the following issue may arise. In other words, a stress resultant of the interlayer-connection conductor becoming bulged from the substrate during the process of forming the interlayer-connection conductor and a stress resultant of the contraction of the substrates during the process of firing the substrate body concentrate near the identification mark. As a result, defects such as cracking may occur in the identification mark and the substrate body around the identification mark.

In the present configuration, the identification mark is provided at a position offset from the interlayer-connection conductor, in a view from the thickness direction. Therefore, these stresses do not concentrate near the identification mark. As a result, it is possible to reduce the risk of defects such as cracking of the identification mark and the substrate body.

In the electronic component, the shield conductor may be provided on one of the pair of principal surfaces, without providing the shield conductor on the other one of the pair of principal surfaces and the side surfaces.

The electronic component includes an LC resonator. In the present configuration, the shield conductor is provided only on one of the pair of principal surfaces of the outer surface of the substrate body. With this, less magnetic flux from the LC resonator is shielded by the shield conductor.

If the shield conductor is provided on the side surfaces of the substrate body, as well as on one of the pair of principal surfaces of the substrate body, the magnetic flux of the LC resonator is shielded by the shield conductor disposed on the side surfaces of the substrate body. Therefore, the position where the LC resonator can be disposed would be limited to a position offset from the side surfaces of the substrate body, e.g., at the center of the substrate body in a view from the thickness direction. In the present configuration, because the shield conductor is not provided on the side surfaces of the substrate body, it is possible to dispose the LC resonator near the side surfaces of the substrate body. That is, there is no limitation on where the LC resonator is disposed, such as that described above.

In the electronic component, the identification mark may be made of a nonmetallic material.

Usually, the shield conductor, which is conductive, is made of a metal such as copper or silver. Such an identification mark is read using a camera, for example. If the identification mark is made of a metal material, both the identification mark and the shield conductor reflect the light from the camera, so the visibility of the identification mark with respect to the shield conductor deteriorates. In the present configuration, because the identification mark is made of a nonmetallic material, it is possible to suppress the deterioration of visibility, such as that described above.

In the electronic component, the identification mark may include at least a first powder having a first particle size and a second powder having a second particle size that is larger than the first particle size.

In the present configuration, the identification mark is more likely to have protrusions and recesses on the surface, than the identification mark including only powders having the same particle diameter. As the stack of the substrates is laminated in the manufacturing process of the electronic component, the protrusions and the recesses on the surface of the identification mark are infixed into the shield conductor. As a result, adhesiveness between the identification mark and the shield conductor is enhanced. Furthermore, as the protrusions and the recesses on the surface of the identification mark are infixed into the shield conductor, protrusions and recesses are formed the surface of the shield conductor, accordingly. By infixing the protrusions and the recesses on the surface of the shield conductor into the substrate body, adhesiveness between the shield conductor and the substrate body is enhanced. As described above, with this configuration, the adhesiveness between the identification mark and the shield conductor and the adhesiveness between the shield conductor and the substrate body can be improved.

First Embodiment

Figure 2:
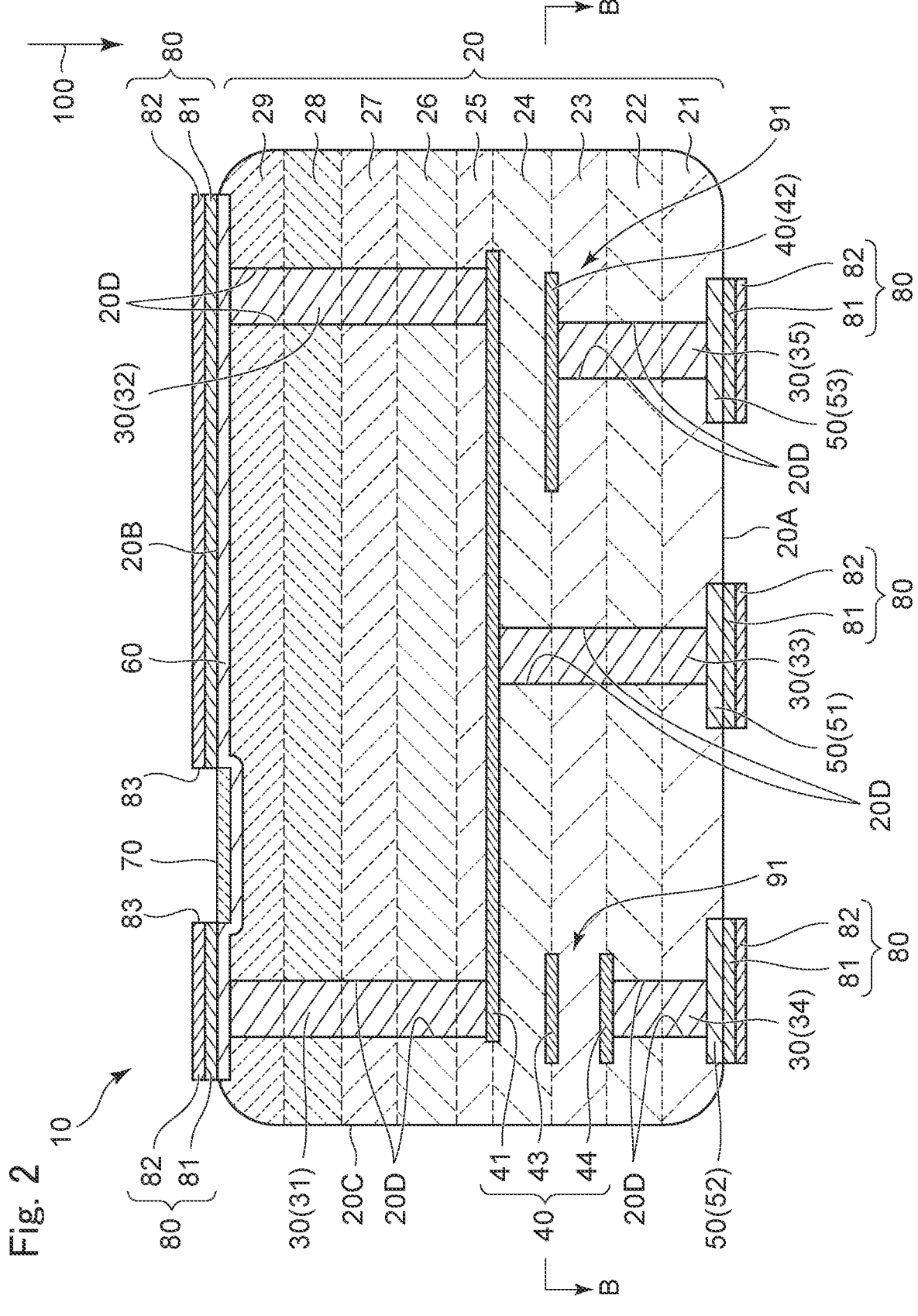
FIG. 2 is a cross-sectional view showing the cross section A-A in FIG. 1.

FIG. 1 is a plan view of an electronic component according to a first embodiment of the present disclosure. FIG. 2 is a cross-sectional view showing the cross section A-A in FIG. 1. The electronic component is a substrate body provided with an identification mark. In the electronic component according to the first embodiment, the substrate body is also provided with an internal electrode, an external electrode, and a shield conductor, in addition to the identification mark. The electronic component may be mounted on a mother board or the like, via an external electrode.

As shown in FIGS. 1 and 2, an electronic component 10 according to the first embodiment includes a substrate body 20, interlayer-connection conductors 30, internal electrodes 40, external electrodes 50, a shield conductor 60, an identification mark 70, and a plating layer 80.

The substrate body 20 has a cuboid shape as a whole. The shape of the substrate body 20 is, however, not limited to a cuboid shape. In the first embodiment, the substrate body 20 is an integration of substrates 21 to 29 that are stacked in thickness direction 100. That is, in the first embodiment, the substrate body 20 is an integration of nine substrates. The number of substrates included in the substrate body 20 is not limited to nine. Each of the substrates 21 to 29 is insulating, and has a plate-like shape. In the first embodiment, the substrate body 20 (the substrates 21 to 29) is made of low temperature co-fired ceramic (LTCC). The substrate body 20 is not limited to an LTCC, and may be made of ceramic other than an LTCC such as alumina, or may be made of resin such as glass epoxy, Teflon (registered trademark), or paper phenol.

As shown in FIG. 2, the substrate body 20 includes a pair of principal surfaces 20A, 20B and a side surface 20C. A principal surface 20A is a principal surface of the substrate 21, on the side facing external of the substrate body 20. A principal surface 20B is a principal surface of a substrate 29, on the side facing external of the substrate body 20. The principal surface 20B faces the opposite side of the principal surface 20A. The side surface 20C is configured by side surfaces of the substrates 21 to 29. The side surface 20C connects the principal surfaces 20A, 20B. In the first embodiment, the principal surface 20B corresponds to one of the pair of principal surfaces, and the principal surface 20A corresponds to the other of the pair of principal surfaces.

In the first embodiment, the pair of principal surfaces 20A, 20B is perpendicular to the thickness direction 100. The plan view illustrated in FIG. 1 is a view of the electronic component 10 in the thickness direction 100 (see FIG. 2).

As shown in FIG. 2, the interlayer-connection conductor 30 is provided internal of the substrate body 20. The interlayer-connection conductor 30 may be formed in at least one of the substrates 21 to 29. In the first embodiment, the interlayer-connection conductor 30 is provided in the substrates 21 to 29.

The interlayer-connection conductor 30 is a conductive paste filled in a via 20D penetrating at least one of the plurality of substrates 21 to 29 in the thickness direction 100, and is co-fired with ceramic (LTCC in the first embodiment) that forms the substrate body 20. The conductive paste contains, for example, a conductive powder such as copper powder. The conductive powder contained in the conductive paste is not limited to copper, and may be silver, for example. When the substrate body 20 is made of resin, the interlayer-connection conductor 30 is made of a plated conductive metal such as copper. In the first embodiment, because the via 20D has a cylindrical shape, the interlayer-connection conductor 30 also has a cylindrical shape. The shape of the via 20D is not limited to a cylindrical shape, and may be, for example, a shape such as a quadrangular prism.

In FIG. 2, the interlayer-connection conductor 30 includes five interlayer-connection conductors 31 to 35. The inter-layer-connection conductors 31, 32 are filled in vias 20D penetrating the substrate 25 to 29. The interlayer-connection conductor 33 is filled in the via 20D penetrating the substrate 21 to 24. The interlayer-connection conductor 34 is filled in the via 20D penetrating the substrates 21 and 22. The interlayer-connection conductor 35 is filled in the via 20D penetrating the substrate 21 to 23. The number of the interlayer-connection conductors 30 is not limited to five. The length of each of the interlayer-connection conductors 31 to 35 in the thickness direction 100 (the number of substrates the interlayer-connection conductor 31 to 35 penetrates) is not limited to the length described above.

Figure 3:
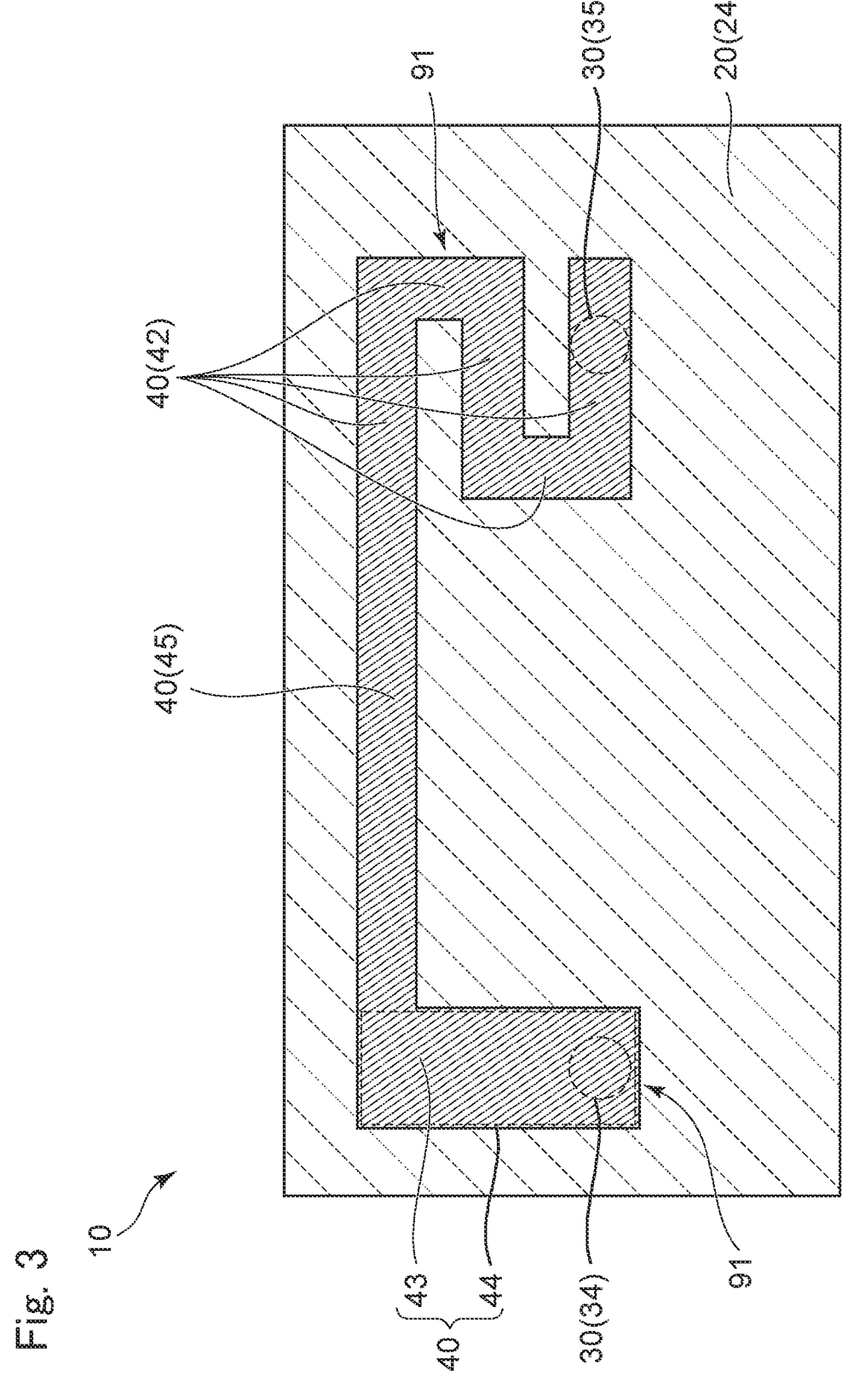
FIG. 3 is a cross-sectional view showing the cross section B-B in FIG. 2.

FIG. 3 is a cross-sectional view showing the cross section B-B in FIG. 2. As shown in FIGS. 2 and 3, the internal electrodes 40 are provided inside the substrate body 20, and are not exposed to the external of the substrate body 20. The internal electrodes 40 may be formed on at least one of the substrates 21 to 29. In the first embodiment, the internal electrodes 40 are provided on the respective substrates 23 to 25.

When the substrate body 20 is made of ceramic as in the first embodiment, the internal electrodes 40 are formed by printing a conductive paste on a principal surface of a substrate (the substrate 23 to 25 in the first embodiment) and co-firing the paste with the substrate. The conductive paste is made of copper or silver, for example. When the substrate body 20 is made of resin, the internal electrode 40 is provided on the principal surface of the substrate using a known technique such as etching of a metal foil.

In the first embodiment, the internal electrode 40 includes five internal electrodes 41 to 45. The internal electrode 41 is provided on the substrate 25. The internal electrodes 42, 43, and 45 are provided on the substrate 24 (see FIG. 3). The internal electrode 44 is provided on the substrate 23.

Each of the internal electrodes 40 is electrically connected to another internal electrode 40 or to an external electrode 50. In the first embodiment, as shown in FIG. 2, the internal electrode 41 is electrically connected to the shield conductor 60 via the interlayer-connection conductors 31, 32, and is electrically connected to an external electrode 51 via the interlayer-connection conductor 33. The internal electrode 42 is electrically connected to the external electrode 53 via the interlayer-connection conductor 35. As shown in FIG. 3, the internal electrodes 42 and 43 are electrically connected to each other via the internal electrode 45. As shown in FIG. 2, the internal electrode 44 is electrically connected to an external electrode 52 via the interlayer-connection conductor 34.

Each of the external electrodes 50 is provided external of the substrate body 20. That is, the external electrode 50 is exposed to the external of the substrate body 20. In the first embodiment, the external electrode 50 is provided on a principal surface of the substrate 21 (the principal surface 20A of the substrate body 20). Note that the external electrode 50 may also be provided on at least one of the principal surface 20B of the substrate body 20 and the side surface 20C of the substrate body 20, instead of the principal surface 20A of the substrate body 20 or in addition to the principal surface 20A of the substrate body 20.

The external electrode 50 is configured in the same manner as the internal electrode 40. That is, in the first embodiment, the external electrode 50 is formed by printing a conductive paste on the principal surface 20A of the substrate body 20 and co-firing the paste with the substrate 21 to 29. In the first embodiment, the external electrode 50 includes three external electrodes 51 to 53.

As mentioned earlier, the external electrode 51 is electrically connected to the internal electrode 41 via the interlayer-connection conductor 33; the external electrode 52 is electrically connected to the internal electrode 44 via the interlayer-connection conductor 34; and the external electrode 53 is electrically connected to the internal electrode 42 via the interlayer-connection conductor 35.

In the first embodiment, the external electrode 51 is electrically connected to the ground to be grounded. For example, the external electrode 51 is electrically connected to an electrode provided on another substrate on which the electronic component 10 is mounted, and having a ground potential (for example, a mother board).

At least a part of the internal electrode 40 and at least a part of the interlayer-connection conductor 30 together form an LC resonator 91 including an inductor and a capacitor.

As shown in FIG. 3, the internal electrode 42 has a meandering shape, in a view from the thickness direction 100. The internal electrode 42 thus forms a meander coil, and functions as an inductor. The internal electrode 42 is an example of an inductor conductor.

As shown in FIG. 2, the internal electrodes 43, 44 face each other in the thickness direction 100, with the substrate 23 interposed therebetween. The internal electrodes 43, 44 thus form capacitors, and function as capacitors. The internal electrodes 43, 44 are examples of a capacitor conductor.

As shown in FIG. 3, the internal electrode 42 forming a coil and the internal electrode 43 forming a capacitor are electrically connected to each other via the internal electrode 45. That is, the internal electrode 42 to 45 together form the LC resonator 91 in which the coil and the capacitor are electrically connected.

In the first embodiment, as shown in FIG. 2, the inductor conductor (internal electrode 42) is formed on the substrate 24, and the capacitor conductor (internal electrodes 43, 44) is formed on the substrates 23, 24. However, the inductor conductor and the capacitor conductor may be formed on any substrates, among the substrates 21 to 29 included in the substrate body 20. That is, the inductor conductor and the capacitor conductors may be formed on at least one of the substrates 21 to 29 included in the substrate body 20.

The shield conductor 60 is provided on the principal surface 20B of the substrate body 20. The shield conductor 60 is formed by printing, in the same manner as the internal electrodes 40 and the external electrodes 50. The way in which the shield conductor 60 is formed is, however, not limited to printing. For example, the shield conductor 60 may be formed by sputtering or vapor deposition.

The shield conductor 60 is conductive. Typically, at least a part of the shield conductor 60 is made of a metal. In the first embodiment, the shield conductor 60 is made of a conductive member such as copper. It is also possible for a part of the shield conductor 60 to be made of a conductive member. For example, the shield conductor 60 may be made of another material, such as resin, including a conductive material.

In the first embodiment, the shield conductor 60 is embedded in the substrate body 20. The shield conductor 60 therefore forms a part of the principal surface 20B in FIG. 2. Note that it is also possible for the shield conductor 60 not to be embedded in the substrate body 20.

The shield conductor 60 may have a multi-layer structure. For example, the shield conductor 60 may include an adhesive layer that is in contact with the substrate 29, a conductive layer that is in contact with the adhesive layer and that is made of a highly conductive metal, and an anti-rust layer that is in contact with the conductive layer and that prevents oxidation or corrosion of the conductive layer. The conductive layer has a function for shielding electromagnetic waves, and is made of, for example, copper (Cu), silver (Ag), or aluminum (Al). The adhesive layer is provided to enhance the adhesion between the substrate 29 and the conductive layer, and may be made of, for example, titanium (Ti), chromium (Cr), or stainless steel (SUS).

The shield conductor 60 shields the electromagnetic waves from external of the electronic component 10 via the principal surface 20B. With this, it is possible to reduce the effect of the external electromagnetic waves incident on the LC resonator 91 via the principal surface 20B. The shield conductor 60 also shields the electromagnetic waves emitted from the LC resonator 91 to the external, via the principal surface 20B. Therefore, it is possible to reduce of the effect of the electromagnetic waves emitted from the LC resonator 91, on other components external of the electronic component 10.

In the first embodiment, the shield conductor 60 is not provided on the outer perimeter of the principal surface 20B of the substrate body 20, in a view from the thickness direction 100. That is, in the first embodiment, the shield conductor 60 is provided on a part of the principal surface 20B of the substrate body 20. Therefore, as shown in FIG. 1, the substrate 29 is exposed on the outer perimeter of the principal surface 20B of the substrate body 20, in a view from the thickness direction 100.

If the shield conductor 60 is provided on the outer perimeter of the principal surface 20B of the substrate body 20, in a view from the thickness direction 100, the shield conductor 60 on the outer perimeter would be more likely to be subjected to scraping. Once the shield conductor 60 scrapes off, the shield conductor 60 may affect the magnetic flux of the LC resonator 91 differently, and cause the characteristics of the LC resonator 91 to vary. In the first embodiment, the shield conductor 60 is not provided on the outer perimeter of the principal surface 20B of the substrate body 20, in a view from the thickness direction 100. Therefore, the shield conductor 60 is less likely to scrape off. Variations in the characteristics of the LC resonator 91 can be therefore suppressed.

Note that the area not provided with the shield conductor 60 is not limited to the outer perimeter of the principal surface 20B of the substrate body 20, in a view from the thickness direction 100. For example, the area not provided with the shield conductor 60 may be at the center of the principal surface 20B of the substrate body 20, in a view from the thickness direction 100. It is also possible for the shield conductor 60 to be provided across the entire area of the principal surface 20B of the substrate body 20.

In the first embodiment, the shield conductor 60 is not provided on the principal surface 20A and the side surface 20C of the substrate body 20. Therefore, the magnetic flux of the inductor conductor (internal electrode 42) of the LC resonator 91 is not shielded in the principal surface 20A and the side surface 20C of the substrate body 20.

As shown in FIG. 2, the shield conductor 60 is electrically connected to the internal electrode 41 via the interlayer-connection conductors 31, 32. As mentioned earlier, the internal electrode 41 is electrically connected to the external electrode 51 via the interlayer-connection conductor 33, and the external electrode 51 is electrically connected to the ground. That is, the shield conductor 60 is electrically connected to the ground via the interlayer-connection conductors 31 to 33 and the internal electrode 41.

Note that the configuration for electrically connecting the shield conductor 60 to the ground is not limited to the configuration via the interlayer-connection conductors 31 to 33 and the internal electrode 41. For example, the shield conductor 60 may be electrically connected to an external ground via a wire, for example.

As shown in FIG. 2, the identification mark 70 is provided on the surface of the shield conductor 60 provided on the principal surface 20B of the substrate body 20. The identification mark 70 is for indicating the orientation or the direction of the electronic component 10.

In the first embodiment, the electronic component 10 has one identification mark 70, but may include a plurality of identification marks 70. In the first embodiment, as shown in FIG. 1, the identification mark 70 has a rectangular shape in a view from the thickness direction 100, but is not limited to a rectangular shape. In each drawing, the color of the identification mark 70 is indicated as white or hatched, but the color of the identification mark 70 is not limited to white, and may be other colors such as black, gray, or red. The color of the identification mark 70 is preferably a color different from that of the area surrounding the identification mark 70 (the plating layer 80 in the first embodiment).

The identification mark 70 is made of a nonmetallic material. In this manner, it is possible to improve the distinguishability of the identification mark 70 with respect to the plating layer 80 made of a metal material. In the first embodiment, the identification mark 70 is made of an LTCC that is the same material as the substrate body 20.

Note that any material may be used as the material of the identification mark 70, provided that the material is distinguishable from that of the area surrounding the identification mark 70 (the plating layer 80 in the first embodiment). For example, the identification mark 70 may be made of resin. It is also possible to, when the identification mark 70 is made of a material having the same color as or a color similar to the color of the plating layer 80, improve the visibility of the identification mark 70 by coloring the identification mark 70 to a color different from that of the plating layer 80. It is also possible to use a material different from that of the substrate body 20 for the identification mark 70.

In addition, a plurality of types of materials may be mixed for the identification mark 70. For example, the identification mark 70 may include an oxide of any of aluminum (Al), zinc (Zn), zirconium (Zr), titanium (Ti), cobalt (Co), magnesium (Mg), manganese (Mn), calcium (Ca), silicon (Si), iron (Fe), nickel (Ni), chromium (Cr), barium (Ba), or tungsten (W).

In the first embodiment, the identification mark 70 is infixed in the shield conductor 60, and is embedded in the substrate body 20 together with the shield conductor 60. Note that it is also possible for the identification mark 70 not to be infixed in the shield conductor 60 and the substrate body 20.

As shown in FIG. 2, there is no interlayer-connection conductor 30 immediately below the identification mark 70. The identification mark 70 and the interlayer-connection conductor 30 do not overlap with each other in a view from the thickness direction 100. In other words, the identification mark 70 is provided at a position offset from the interlayer-connection conductor 30, in a view from the thickness direction 100.

As shown in FIG. 2, the plating layer 80 covers the external electrodes 50 and the shield conductor 60. The plating layer 80 reduces the effects of atmosphere, moisture, and the like, on the external electrodes 50 and the shield conductor 60. The plating layer 80 is a film made of Ni (nickel)-Sn (tin), or Ni (nickel)-electroless Au (gold), for example. In the first embodiment, the plating layer 80 includes an inner layer 81 made of nickel and an outer layer 82 made of gold. The inner layer 81 is provided on the surfaces of the external electrodes 50 and the shield conductor 60. The outer layer 82 is provided on the inner layer 81, on the side facing the opposite side of the external electrodes 50 and the shield conductor 60.

In the first embodiment, the plating layer 80 includes two layers (the inner layer 81 and the outer layer 82), but the plating layer 80 may also include one layer or three or more layers.

The configuration of the plating layer 80 may be decided based on the contrast with the identification mark 70. For example, when the identification mark 70 is made of a ceramic paste containing zinc oxide (ZnO), the color of which is near black, gold is used for the outermost layer (for example, the outer layer 82) of the plating layer 80. In this manner, it is possible to ensure the contrast of the black identification mark 70 with respect to the gold surrounding the identification mark 70. As another example, when the identification mark 70 is made of a white ceramic paste containing aluminum oxide (Al$_2$O$_3$), tin, which is gray, is used for the outermost layer (for example, the outer layer 82) of the plating layer 80. In this manner, it is possible to ensure the contrast of the white identification mark 70 with respect to gray surrounding identification mark 70. In the manner described above, the visibility of the identification mark 70 can be improved.

The plating layer 80 is formed on the surface of the metal material. Therefore, the plating layer 80 is not formed on the surface of the identification mark 70, which is formed of a nonmetallic material. As a result, the identification mark 70 is exposed to the external of the electronic component 10, without being covered by the plating layer 80. In the first embodiment, the thickness of the plating layer 80 (the length in the thickness direction 100) is greater than the thickness of the identification mark 70. In addition, the identification mark 70 rests on the bottom of a recess 83 formed by the plating layer 80. As a result, it is possible to reduce the risk of the identification mark 70 coming into contact with another component or the like when the electronic component 10 comes into contact with the other component or the like. As a result, it is possible to reduce the risk of damages of the identification mark 70.

In the first embodiment, because the thickness of the plating layer 80 is greater than the thickness of the identification mark 70, the identification mark 70 rests on the bottom of the recess 83 even in a configuration in which the identification mark 70 is not embedded in the shield conductor 60.

According to the first embodiment, the identification mark 70 is provided on the surface of the shield conductor 60. Therefore, the visibility of the identification mark 70 can be improved, compared with a configuration in which the identification mark 70 is covered by the shield conductor 60.

According to the first embodiment, the shield conductor 60 is interposed between the identification mark 70 and the substrate body 20. Therefore, even when both the identifi-cation mark 70 and the substrate body 20 are both made of ceramics, it is possible to suppress the diffusion of the ceramics.

According to the first embodiment, the substrate body 20 does not have the recess by which the identification mark 70 is formed, on the outer surface of the substrate body 20 (for example, the principal surface 20B). Therefore, the strength of the substrate body 20 can be improved, compared with the configuration in which the recess is provided.

According to the first embodiment, when the stack of the substrates 21 to 29 is laminated in the manufacturing process of the electronic component 10, the shield conductor 60 is pressed into the substrate 29 by the identification mark 70. As a result, adhesiveness between the shield conductor 60 and the substrate body 20 can be enhanced.

In a conventional configuration, for example, an internal electrode on a principal surface of a substrate located internal of the substrate body is electrically connected to a shield conductor provided on a side surface of the substrate body, on the side edge of the substrate. In this configuration, the thickness of the internal electrode determines the area by which the internal electrode is brought into contact with the shield conductor. It is however difficult to increase the thickness of the internal electrode. It is therefore difficult to increase the area by which the internal electrode is brought into contact with the shield conductor.

By contrast, according to the first embodiment, the inter-layer-connection conductors 31, 32 provided in the substrate 29 are electrically connected to the shield conductor 60. With this, the diameters of the vias in the substrate 29 and filled with the interlayer-connection conductors, 31, 32 determine the area by which the interlayer-connection conductors 31, 32 come into contact with the shield conductor 60. It is easier to increase the diameter of a via, than to increase the thickness of the internal electrode 40. It is therefore easier to increase the area by which the interlayer-connection conductors 31, 32 come into contact with the shield conductor 60, than to increase the area by which the internal electrodes 40 come into contact with the shield conductor 60. Therefore, the reliability of the connection between the interlayer-connection conductors 31, 32 and the shield conductor 60 can be improved.

According to the first embodiment, a larger number of the interlayer-connection conductors 30 can be electrically connected to the shield conductor 60. By electrically connecting a larger number of interlayer-connection conductors 30 to the shield conductor 60, it is possible to suppress unnecessary resonance in the LC resonator 91.

If the identification mark 70 is provided at a position overlapping with the interlayer-connection conductor 30, in a view from the thickness direction 100, the following issue may arise. That is, the stress resultant of the interlayer-connection conductor 30 becoming bulged from the substrates 21 to 29 in the process of forming the interlayer-connection conductor 30 and the stress resultant of the contraction of the substrates 21 to 29 in the process of firing the substrate body 20 concentrate near the identification mark 70. As a result, the identification mark 70 and the substrate body 20 around the identification mark 70 may become damaged.

According to the first embodiment, the identification mark 70 is provided at a position offset from the interlayer-connection conductor 30 in a view from the thickness direction 100. Therefore, the stress does not concentrate near the identification mark 70. As a result, it is possible to reduce the risk of damages such as cracking of the identification mark 70 and the substrate body 20.

According to the first embodiment, the electronic component 10 includes the LC resonator 91. In addition, the shield conductor 60 is provided on the principal surface 20B of the substrate body 20, but is not provided on the principal surface 20A and the side surface 20C of the substrate body 20. As a result, less magnetic flux from the LC resonator 91 is shielded by the shield conductor 60.

If the shield conductor 60 is provided on the side surface 20C of the substrate body 20 as well as the principal surface 20B of the substrate body 20, the magnetic flux of the LC resonator 91 is shielded by the shield conductor 60 disposed on the side surface 20C of the substrate body 20. Therefore, the position where the LC resonator 91 can be disposed would be limited to a position offset from the side surface 20C of the substrate body 20, e.g., at the center of the substrate body 20, in a view from the thickness direction 100. According to the first embodiment, because the shield conductor 60 is not provided on the side surface 20C of the substrate body 20, it is possible to position the LC resonator 91 near the side surface 20C of the substrate body 20. That is, there is no limitation on the position where the LC resonator 91 is provided, such as that described above.

Usually, the shield conductor 60, which is conductive, is made of a metal such as copper or silver. Such an identification mark 70 is read using a camera, for example. If the identification mark 70 is made of a metal material, both the identification mark 70 and the shield conductor 60 reflect the light from the camera, so the visibility of the identification mark 70 with respect to the shield conductor 60 deteriorates. According to the first embodiment, because the identification mark 70 is made of a nonmetallic material, it is possible to suppress the deterioration of the visibility, such as that described above.

<Method for Manufacturing Electronic Component According to First Embodiment>

Figure 4:
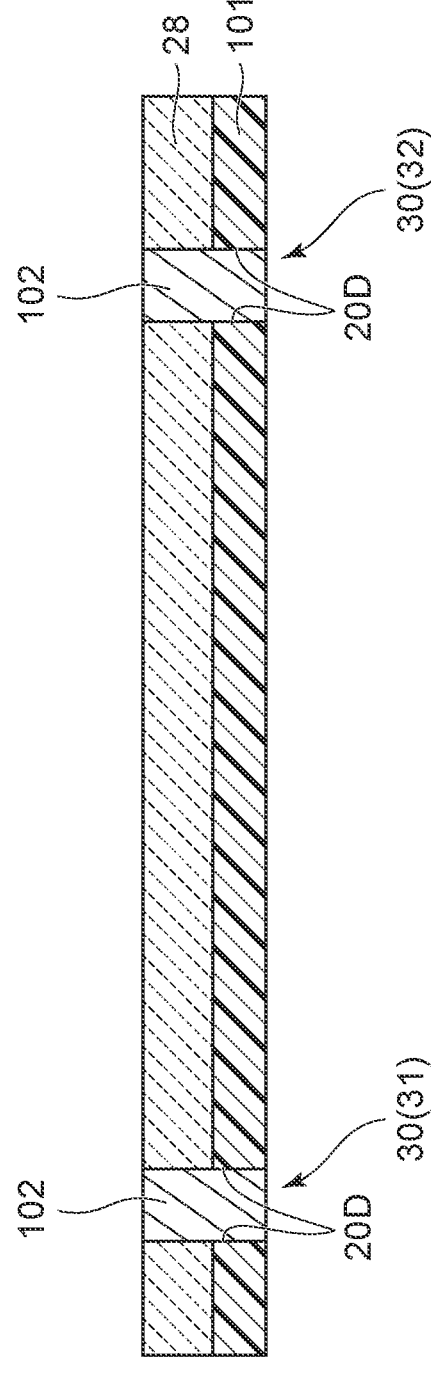
FIG. 4 is a cross-sectional view of a substrate resultant of forming interlayer-connection conductors in a process of manufacturing the electronic component according to the embodiment of the present disclosure.
Figure 5:
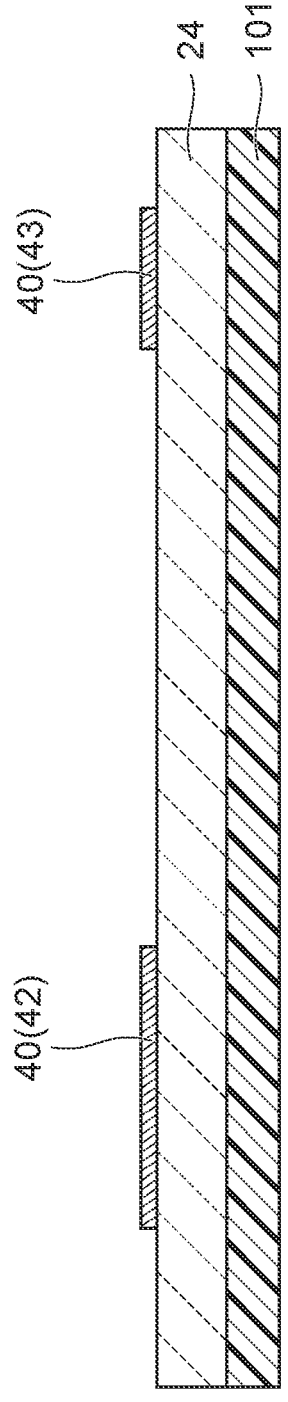
FIG. 5 is a cross-sectional view of the substrate resultant of printing of internal electrodes in the process of manufacturing the electronic component according to the embodiment of the present disclosure.
Figure 6:
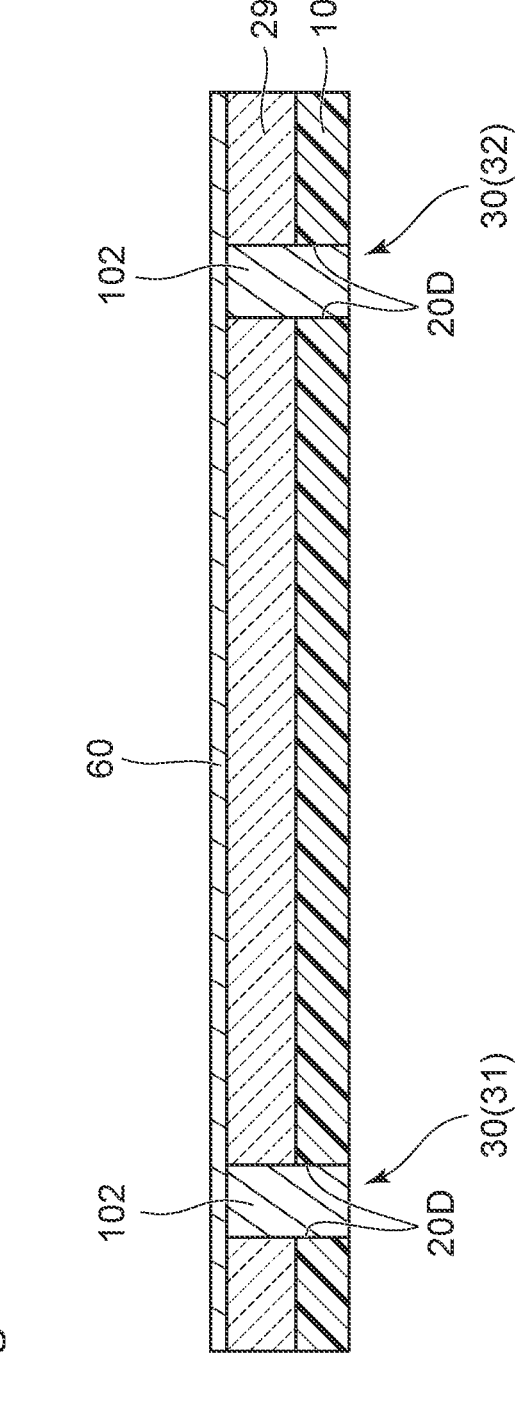
FIG. 6 is a cross-sectional view of the substrate resultant of printing a shield conductor in the process of manufacturing the electronic component according to the embodiment of the present disclosure.
Figure 7:
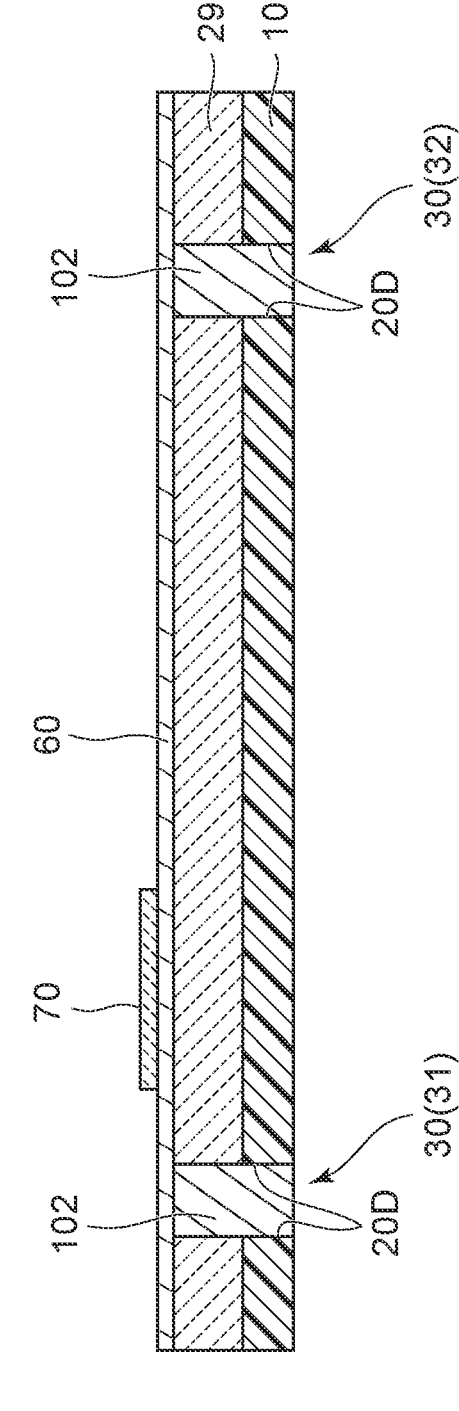
FIG. 7 is a cross-sectional view when an identification mark is printed on the shield conductor, in the process of manufacturing the electronic component according to the embodiment of the present disclosure.
Figure 8:
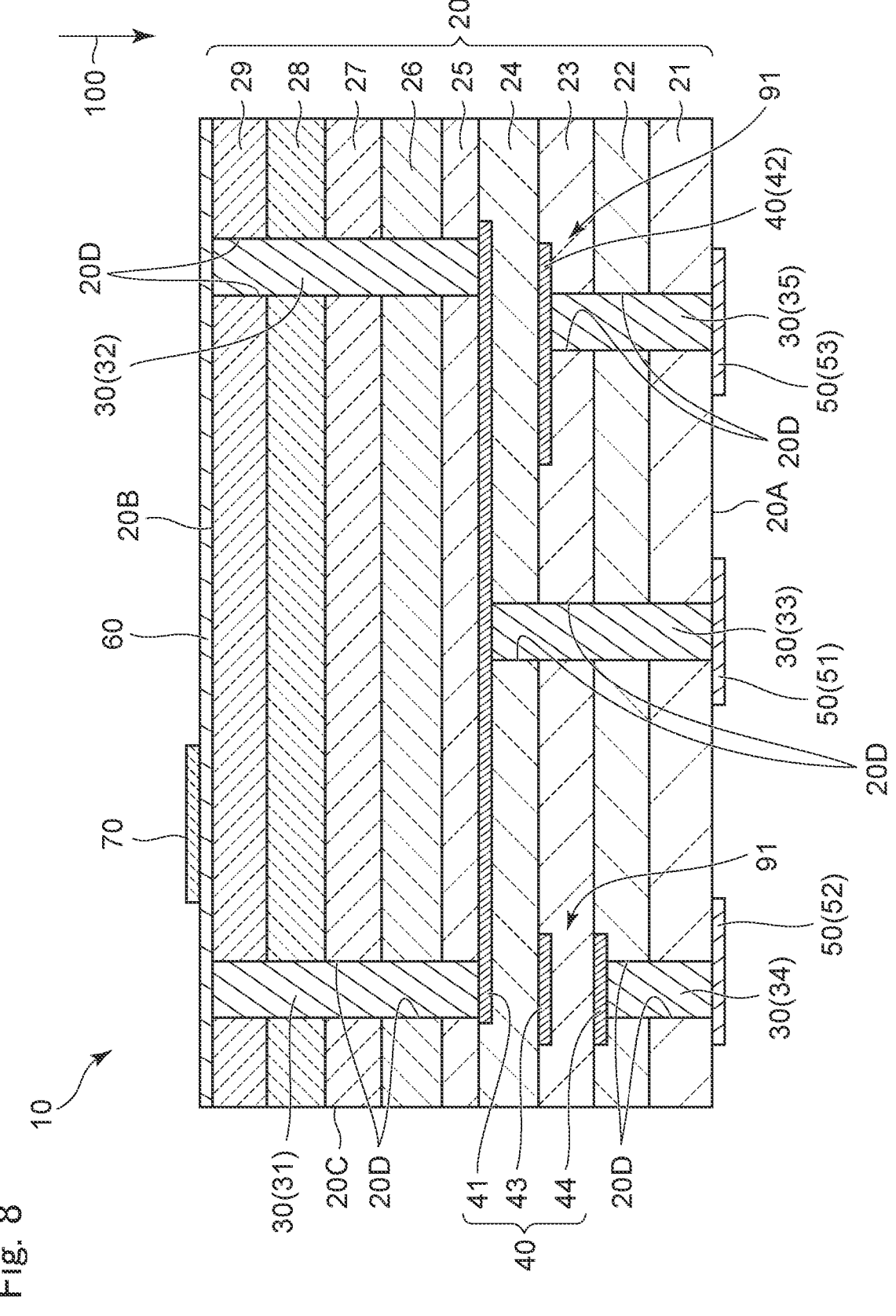
FIG. 8 is a cross-sectional view of a substrate body formed by laminating a plurality of substrates, in the process of manufacturing the electronic component according to the embodiment of the present disclosure.
Figure 9:
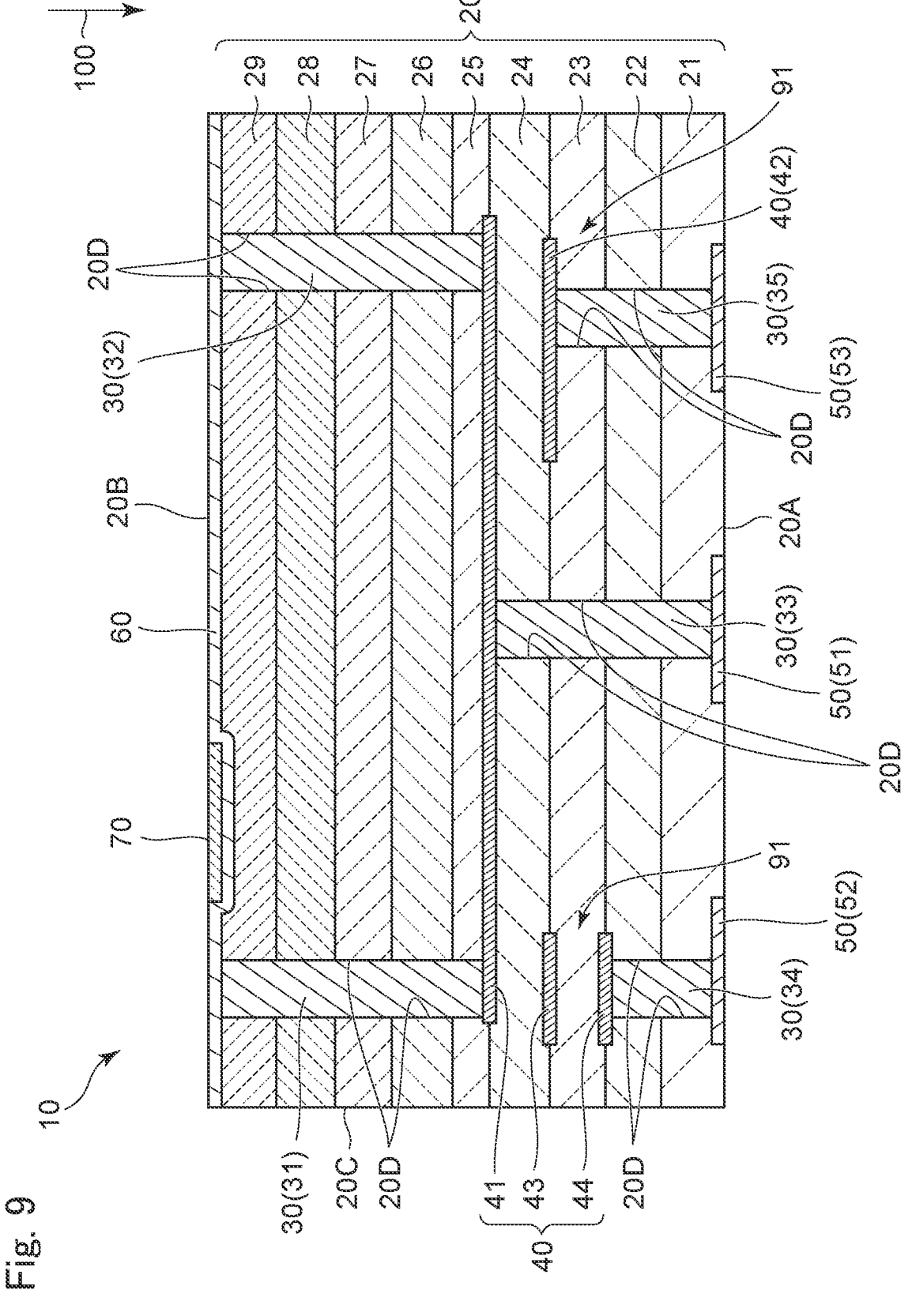
FIG. 9 is a cross-sectional view of the substrate body resultant of laminating, in the process of manufacturing the electronic component according to the embodiment of the present disclosure.

A method for manufacturing the electronic component 10 according to the first embodiment will be described below with reference to FIGS. 4 to 9. FIG. 4 is a cross-sectional view of a substrate resultant of forming interlayer-connection conductors in a process of manufacturing the electronic component according to the embodiment of the present disclosure. FIG. 5 is a cross-sectional view of the substrate resultant of printing of internal electrodes in the process of manufacturing the electronic component according to the embodiment of the present disclosure. FIG. 6 is a cross-sectional view of the substrate resultant of printing a shield conductor in the process of manufacturing the electronic component according to the embodiment of the present disclosure. FIG. 7 is a cross-sectional view when an identification mark is printed on the shield conductor, in the process of manufacturing the electronic component according to the embodiment of the present disclosure. FIG. 8 is a cross-sectional view of a substrate body formed by laminating a plurality of substrates, in the process of manufacturing the electronic component according to the embodiment of the present disclosure. FIG. 9 is a cross-sectional view of the substrate body resultant of laminating, in the process of manufacturing the electronic component according to the embodiment of the present disclosure.

The electronic component 10 is manufactured by singulating the laminate into a plurality of substrate bodies 20. The laminate is an integration of an arrangement of a plurality of substrate bodies 20. In FIGS. 4 to 9, for the convenience of description, only the portion corresponding to one substrate body 20 of the laminate is shown. The method for manufacturing the electronic component 10 according to the first embodiment includes a sheet formation step, an interlayer-connection conductor formation step, an electrode formation step, a shield conductor formation step, an identification mark formation step, a substrate body formation step, a lamination step, a singulation step, a firing step, and a plating layer formation step.

(Sheet Formation Step)

First, a sheet formation step is performed. In the sheet formation step, each of the substrates 21 to 29 shown in FIG. 2 is formed separately. For the substrates 21 to 29 formed in the sheet formation step, raw materials including a main agent, a plasticizer, a binder, and the like corresponding to each of the substrates 21 to 29 are mixed to prepare a slurry for forming the substrate 21 to 29. At this stage, each of the substrates 21 to 29 is a green sheet made from a slurry.

For each of the substrates 21 to 29, a sintering ceramic powder is used as a main agent, for example. As the plasticizer, phthalic acid ester or di-n-butyl phthalate is used, for example. As the binder, an acrylic resin or polyvinyl butyral is used, for example.

The slurry for forming each of the substrates 21 to 29 is formed into a sheet-like shape on a carrier film 101 shown in FIG. 4, using a lip coater or a doctor blade, for example. That is, the nine substrates 21 to 29 are formed on nine carrier films 101, respectively. As the carrier film 101, a polyethylene terephthalate (PET) film is used, for example. The thickness of each of the substrates 21 to 29 is set to 5 (µm) to 100 (µm), for example.

FIG. 4 shows the carrier film 101, and the substrate 28 formed on the carrier film 101.

Vias 20D penetrating the substrates 21 to 29 and the carrier film 101 in the thickness direction are then punched.

In FIG. 4, two vias 20D are punched on the substrate 28 and the carrier film 101, but the number of vias 20D punched on the substrates 21 to 29 is not limited to two. Furthermore, the number of vias 20D punched on the substrates 21 to 29 may be the same or different. Furthermore, the vias 20D in the substrates 21 to 29 may be punched at the same position or different positions.

In the method for manufacturing the electronic component 10 according to the first embodiment, the number and positions of the vias 20D punched in the nine substrates 21 to 29 and the carrier film 101 are determined so that the substrate body 20 shown in FIG. 2 is achieved.

(Interlayer-Connection Conductor Formation Step)

The interlayer-connection conductor formation step is performed next. In the interlayer-connection conductor formation step, the vias 20D, which have been punched in the substrates 21 to 29 and the carrier film 101 in the sheet formation step, are filled with conductive paste 102 (see FIG. 4). The paste 102 filled in the vias 20D corresponds to the interlayer-connection conductors 30.

The paste 102 is prepared by mixing raw materials including a conductive powder, a plasticizer, and a binder, for example.

(Electrode Formation Step)

The electrode formation step is performed next. In the electrode formation step, the internal electrodes 40 and the external electrodes 50 are formed.

In the method for manufacturing the electronic component 10 according to the first embodiment, for example, as shown in FIG. 5, paste corresponding to the internal electrodes 42 and 43 is applied on the principal surface of the substrate 24. The paste is applied by screen printing, inkjet printing, or gravure printing, for example. The other internal electrodes 40 (internal electrodes 41, 44, and 45) and the external electrodes 50 are also formed on each substrate 21 to 29, in the same manner as the internal electrodes 42 and 43.

The paste corresponding to the internal electrodes 40 and the external electrodes 50 is prepared by mainly mixing raw materials containing a conductive powder, a plasticizer, and a binder, in the same manner as the paste 102 described above. The paste corresponding to the internal electrodes 40 and the external electrodes 50 may be made of the same raw materials as those of the paste 102, or may be made of raw materials different from those of the paste 102.

(Shield Conductor Formation Step)

The shield conductor formation step is performed next. In the shield conductor formation step, the shield conductor 60 is formed.

In the method for manufacturing the electronic component 10 according to the first embodiment, as shown in FIG. 6, paste corresponding to the shield conductor 60 is applied on the principal surface of the substrate 29. The paste corresponding to the shield conductor 60 is applied by screen printing, inkjet printing, gravure printing, sputtering, vapor deposition, or a transfer method, for example. When the transfer method is used, the shield conductor is printed after the identification mark is printed, as will be described later.

The paste corresponding to the shield conductor is prepared by mainly mixing raw materials including a conductive powder, a plasticizer, and a binder, in the same manner as for the pastes described above (the paste corresponding to the internal electrode 40 and the paste 102 corresponding to the external electrodes 50). The paste corresponding to the shield conductor may be made of the same raw materials as those of the paste described above, or may be made of raw materials that are different from those of the paste described above.

The shield conductor formation step may be performed before the electrode formation step, or in parallel with the electrode formation step.

(Identification Mark Formation Step)

The identification mark formation step is performed next. In the identification mark formation step, the identification mark 70 is formed.

In the method for manufacturing the electronic component 10 according to the first embodiment, as shown in FIG. 7, the paste corresponding to the identification mark 70 is applied on the shield conductor 60, which has been formed on the principal surface of the substrate 29 in the shield conductor formation step. The paste corresponding to the identification mark 70 is applied by screen printing, inkjet printing, gravure printing, or a transfer method, for example. The paste corresponding to the identification mark 70 is made of the materials for forming the identification mark 70, described above. In the method for manufacturing the electronic component 10 according to the first embodiment, the paste corresponding to the identification mark 70 is a ceramic paste. With the transfer method, the identification mark is printed on a transfer sheet, and then the shield conductor is printed on top of the identification mark, on the transfer sheet. The transfer sheet is then laid on the substrate 29 in such a manner that the shield conductor faces the substrate 29, in a substrate body formation step to be described below.

(Substrate Body Formation Step)

The substrate body formation step is performed next. In the substrate body formation step, as shown in FIG. 8, the substrates 21 to 29, excluding the carrier film 101, are stacked. As a result, the substrate body 20 is formed.

In the substrate body formation step, the nine substrates 21 to 29 are stacked in the order from those with smaller reference numerals to those with larger reference numerals, specifically, in the order of substrates 21, 22, 23, 24, 25, 26, 27, 28, and 29. As a result, a principal surface of the substrate 21 becomes the principal surface 20A of the substrate body 20, and a principal surface of the substrate 29 becomes the principal surface 20B of the substrate body 20. The side surfaces of the substrate 21 to 29 together form the side surface 20C of the substrate body 20.

In the first embodiment, some of the nine substrates 21 to 29 are turned upside down, and stacked on substrates other than the some of the nine substrates 21 to 29. In the example shown in FIG. 8, the substrates 21 to 25 are stacked with their surface on the side of the carrier film 101 facing upwards in the drawing, and the substrates 26 to 29 are stacked with their surface on the side of the carrier film 101 facing downwards, in the drawing. With this, as shown in FIG. 8, the internal electrodes 40 formed on the substrates 23 to 25 and the external electrodes 50 formed on the substrate 21 come to be positioned under the substrates 23 to 25, and 21, respectively, and the shield conductor 60 formed on the substrate 29 comes to be positioned on top of the substrate 29. It is also possible for the nine substrates 21 to 29 to be stacked without turning upside down. For example, when a transfer method is used for printing the shield conductor and the identification mark, the nine substrates 21 to 29 are stacked without turning upside down.

(Lamination Step)

The lamination step is performed next. In the lamination step, the stacked substrates 21 to 29 are laminated in a die.

As shown in FIG. 9, when the substrates 21 to 29 are laminated, the internal electrodes 40 are infixed into the substrates 23 to 25, and the external electrodes 50 are infixed into the substrate 21, and the shield conductor 60 are infixed into the substrate 29. In addition, the identification mark 70 is infixed into the shield conductor 60, and further infixed into the substrate 29, with the shield conductor 60. As a result, the shield conductor 60 and the identification mark 70 become embedded in the substrate body 20.

(Singulation Step)

The singulation step is performed next. In the singulation step, the laminate including an arrangement of the plurality of substrate bodies 20 is cut into the plurality of substrate bodies 20. To cut the laminate, a dicing saw, a guillotine cutter, a laser, or the like is used, for example. After the laminate is cut, the corners and the edges of the substrate bodies 20 may be polished by performing barrel processing or the like (see FIG. 2), for example. This polishing may also be performed after the firing step.

(Firing Step)

The firing step is performed next. In the firing step, the substrates 21 to 29 are fired, to form the substrate body 20 as a sintered body (see FIG. 2).

(Plating Layer Formation Step)

The plating layer formation step is performed next. In the plating layer formation step, the external electrodes 50 and the shield conductor 60 are subjected to known plating. As a result, as shown in FIG. 2, the plating layer 80 is formed in a manner covering the external electrodes 50 and the shield conductor 60.

Modification of First Embodiment

Figure 10:
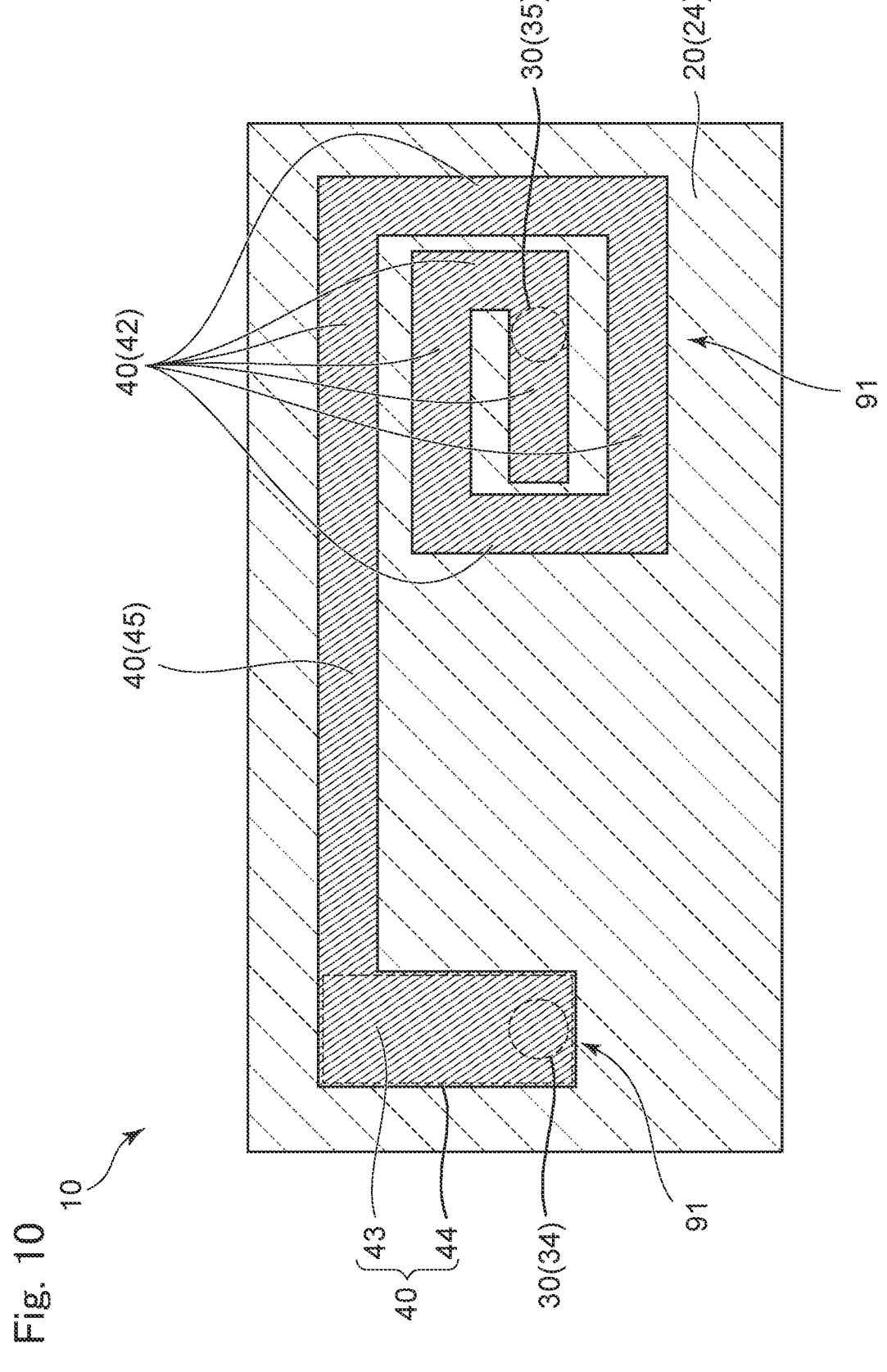
FIG. 10 is a cross-sectional view of an electronic component according to a modification of the first embodiment of the present disclosure, taken along a position corresponding to the cross section B-B in FIG. 2.

In the embodiment described above, the internal electrode 42 serving as an inductor forms a meander coil. However, the inductor included in the LC resonator 91 is not limited to a meander coil. For example, as shown in FIG. 10, the internal electrode 42 may be a spiral coil, in a plan view. FIG. 10 is a cross-sectional view of the electronic component according to the modification of the first embodiment of the present disclosure, taken along a position corresponding to the cross section B-B in FIG. 2.

Figure 11:
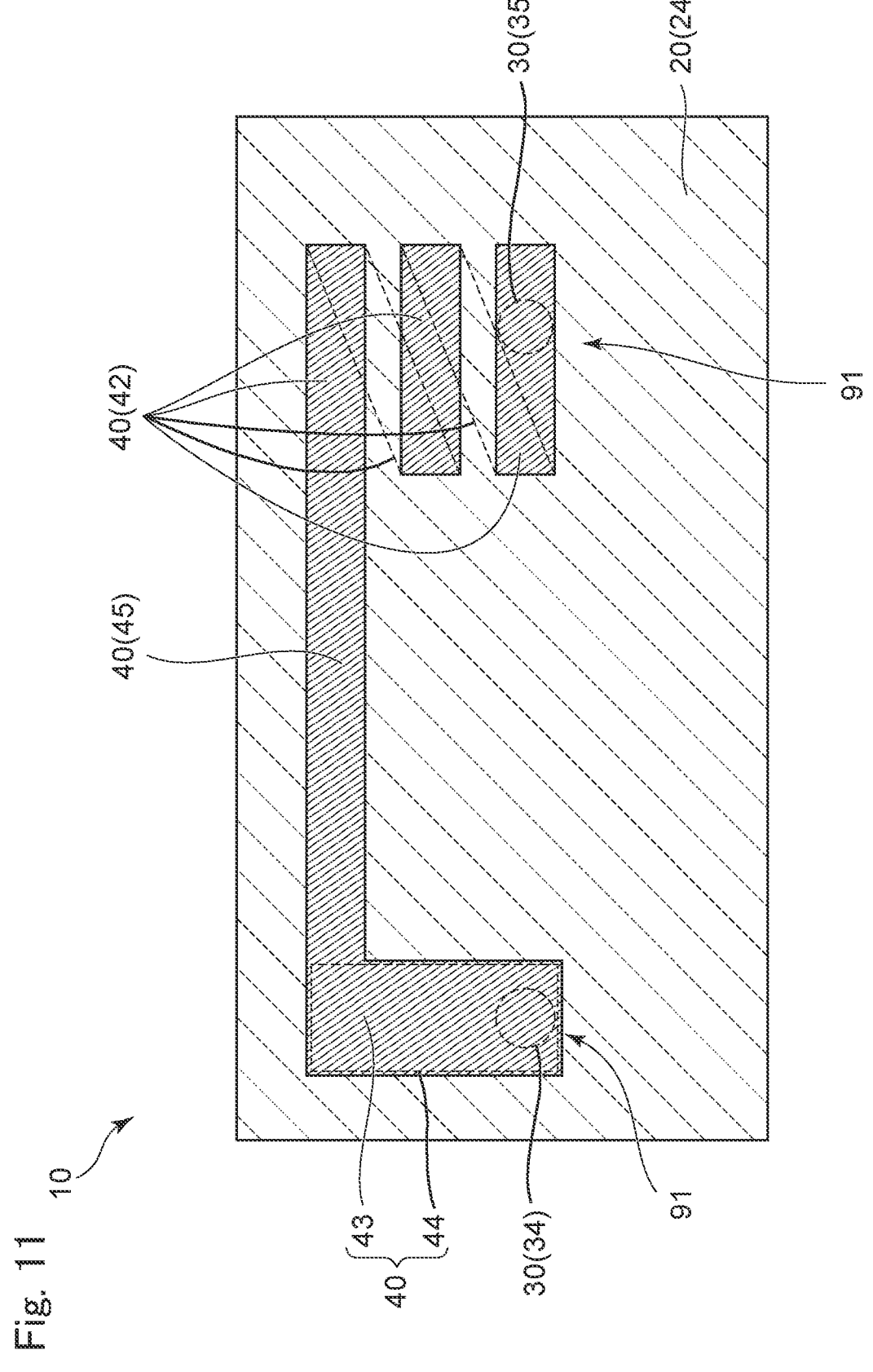
FIG. 11 is a cross-sectional view of the electronic component according to another modification of the first embodiment of the present disclosure, taken along a position corresponding to the cross section B-B in FIG. 2.

Furthermore, for example, as shown in FIG. 11, the internal electrode 42 may be a spiral coil in a side view. FIG. 11 is a cross-sectional view of the electronic component according to another modification of the first embodiment of the present disclosure, taken along a position corresponding to the cross section B-B in FIG. 2. Note that the internal electrodes 42 indicated by broken lines in FIG. 11 are formed on a substrate different from the substrate 23 (e.g., on the substrate 24). In FIG. 11, the internal electrodes 42 indicated by solid lines and the internal electrodes 42 indicated by broken lines are electrically connected by interlayer-connection conductors (not shown). In this manner, the internal electrode 42 shown in FIG. 11 delineates a spiral coil.

In the embodiment described above, the axis about which the coil of the internal electrode 42 is wound extends in the thickness direction 100. However, the axis of the winding of the coil may extend in a direction other than the thickness direction 100. For example, in the electronic component 10 shown in FIG. 11, the axis of the winding of the coil forming the internal electrode 42 extends along a direction following the principal surface of the substrate 24 (in other words, a direction perpendicular to the thickness direction 100).

Figure 12:
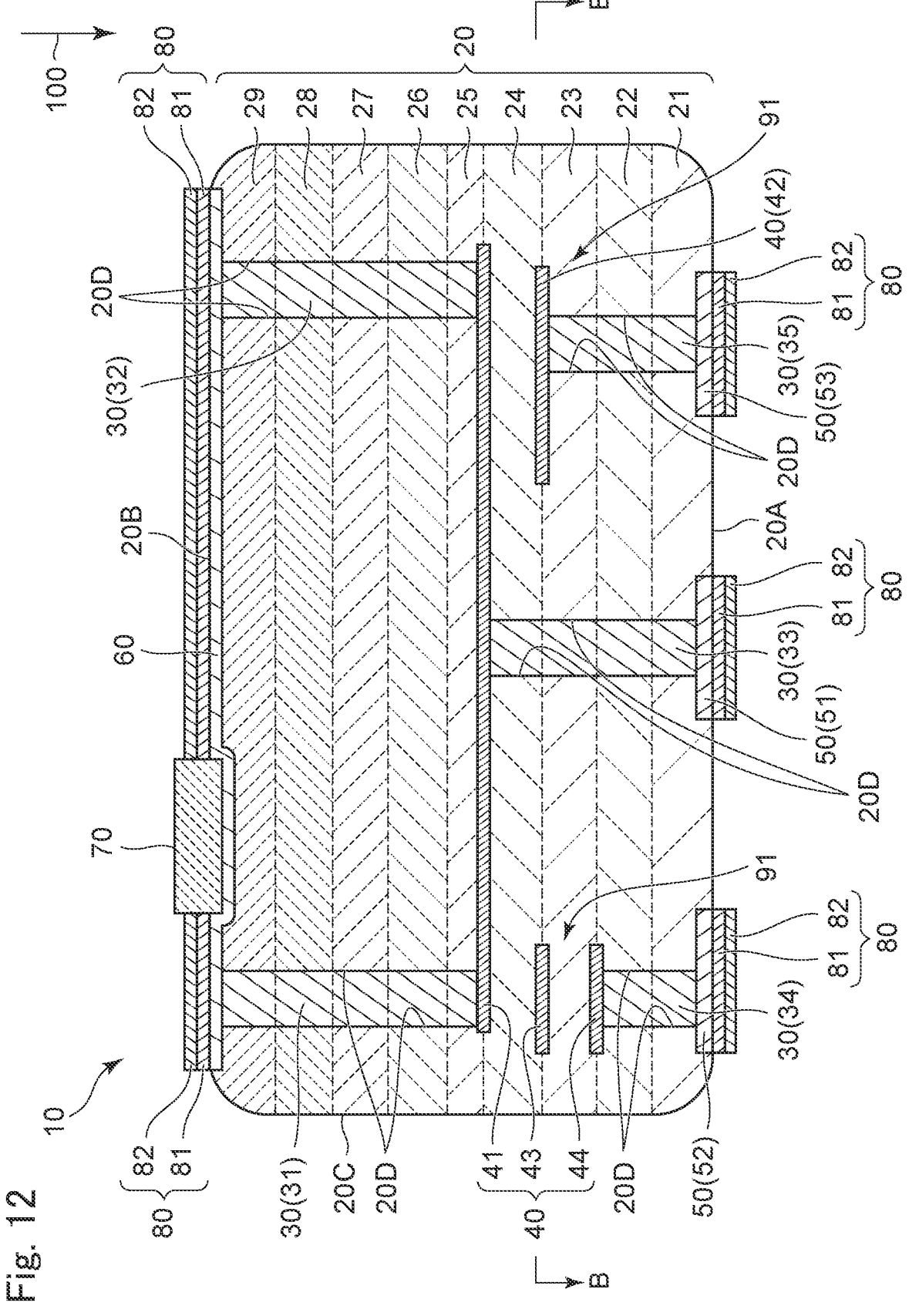
FIG. 12 is a cross-sectional view of the electronic component according to another modification of the first embodiment of the present disclosure, taken along a position corresponding to the cross section A-A in FIG. 1.

In the embodiment described above, as shown in FIG. 2, the entire identification mark 70 is infixed in the substrate body 20, and the identification mark 70 rests on the bottom of the recess 83 formed by the plating layer 80. However, the identification mark 70 may be provided in a manner protruding from the plating layer 80, as shown in FIG. 12. FIG. 12 is a cross-sectional view of the electronic component according to another modification of the first embodiment of the present disclosure, taken along a position corresponding to the cross section A-A in FIG. 1.

The configuration in which the identification mark 70 protrudes from the plating layer 80 is achieved by forming a thick identification mark 70, in the identification mark formation step. For example, a thick identification mark 70 is formed by printing the mark a plurality of number of times in a manner overlapping each other, in the identification mark formation step.

In the embodiment described above, as shown in FIG. 2, the shield conductor 60 is provided on the principal surface 20B of the substrate body 20, but is not provided on the principal surface 20A and the side surface 20C of the substrate body 20. However, the shield conductor 60 may be provided on at least one of the principal surface 20A and the side surface 20C of the substrate body 20, in addition to the principal surface 20B of the substrate body 20. In other words, it is only necessary for the shield conductor 60 to be provided at least to the principal surface 20B of the outer surface of the substrate body 20.

Figure 13:
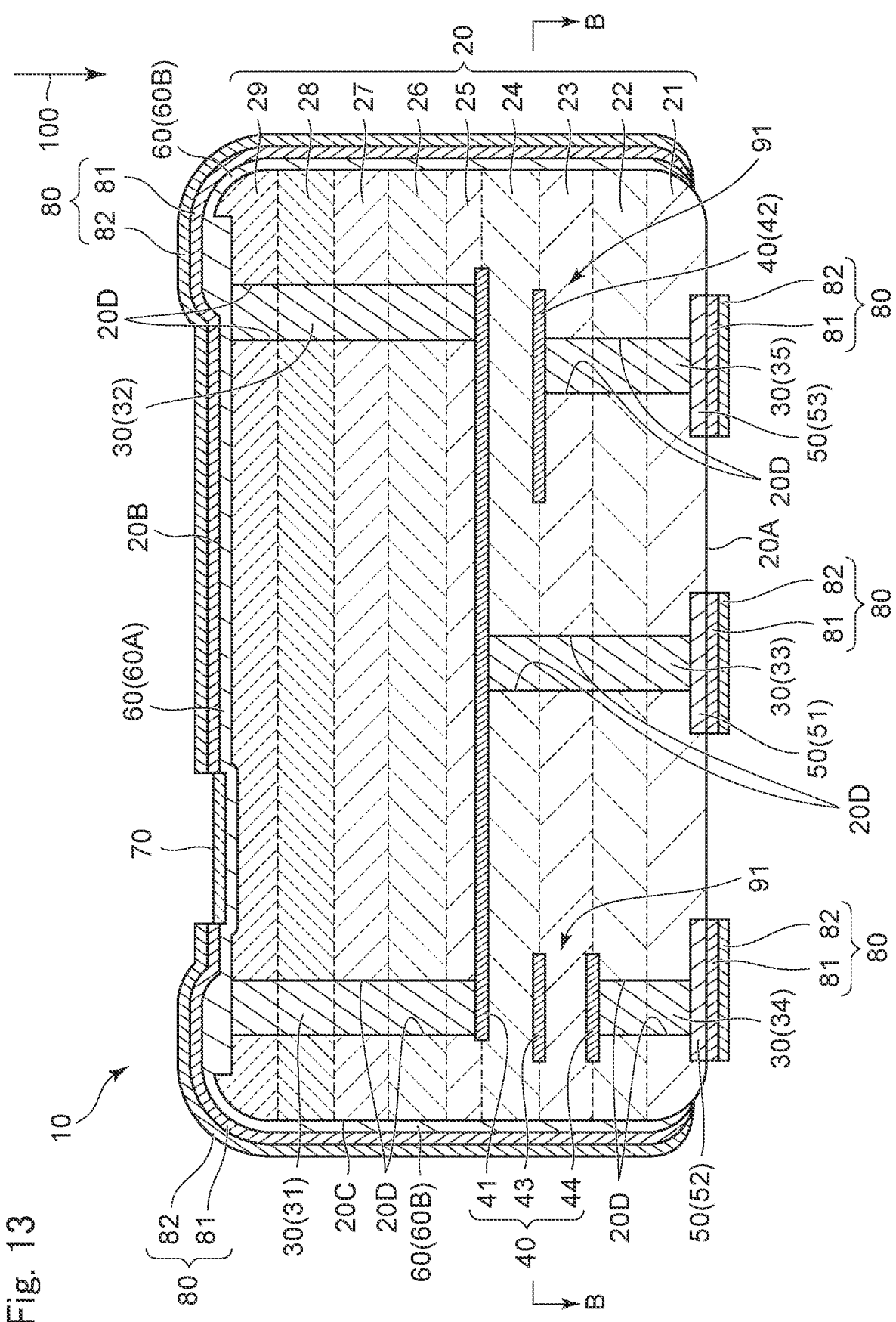
FIG. 13 is a cross-sectional view of the electronic component according to another modification of the first embodiment of the present disclosure, taken along a position corresponding to the cross section A-A in FIG. 1.

For example, the shield conductor 60 may include a principal-surface conductor 60A formed on the principal surface 20B of the substrate body 20 and a side-surface conductor 60B formed on the side surface 20C of the substrate body 20, as shown in FIG. 13. FIG. 13 is a cross-sectional view of the electronic component according to another modification of the first embodiment of the present disclosure, taken along a position corresponding to the cross section A-A in FIG. 1. The side-surface conductor 60B is formed by a known technique, such as a dipping, after the singulation step but before the firing step. In the shield conductor formation step, a principal-surface conductor 60A is formed. The side-surface conductor 60B is formed on the side surface 20C of the substrate body 20 and the outer perimeter of the principal surface 20B of the substrate body 20 using a known technique such as dipping. The side-surface conductor 60B formed on the outer perimeter of the principal surface 20B of the substrate body 20 is electrically connected to the principal-surface conductor 60A.

In the electronic component 10 shown in FIG. 13, in the plating layer formation step, the external electrodes 50, the principal-surface conductor 60A, and the side-surface conductor 60B are subjected to known plating. As a result, the plating layer 80 is laid in a manner covering the external electrode 50, the principal-surface conductor 60A, and the side-surface conductor 60B, as shown in FIG. 13.

In the embodiment described above, as shown in FIG. 2, two interlayer-connection conductors 31, 32 are formed on the substrate 25 to 29, including the substrate 29 on which the shield conductor 60 is formed, and the shield conductor 60 is electrically connected to the ground via the two interlayer-connection conductors 31, 32. However, the number of the interlayer-connection conductors 30 formed on the substrates including the substrate 29 on which the shield conductor 60 is formed, and electrically connecting the shield conductor 60 and the ground is not limited to two.

For example, one interlayer-connection conductor 30 may be provided on the substrate 29 on which the shield conductor 60 is formed, and the shield conductor 60 may be electrically connected to the ground via the one interlayer-connection conductor 30.

Figure 14:
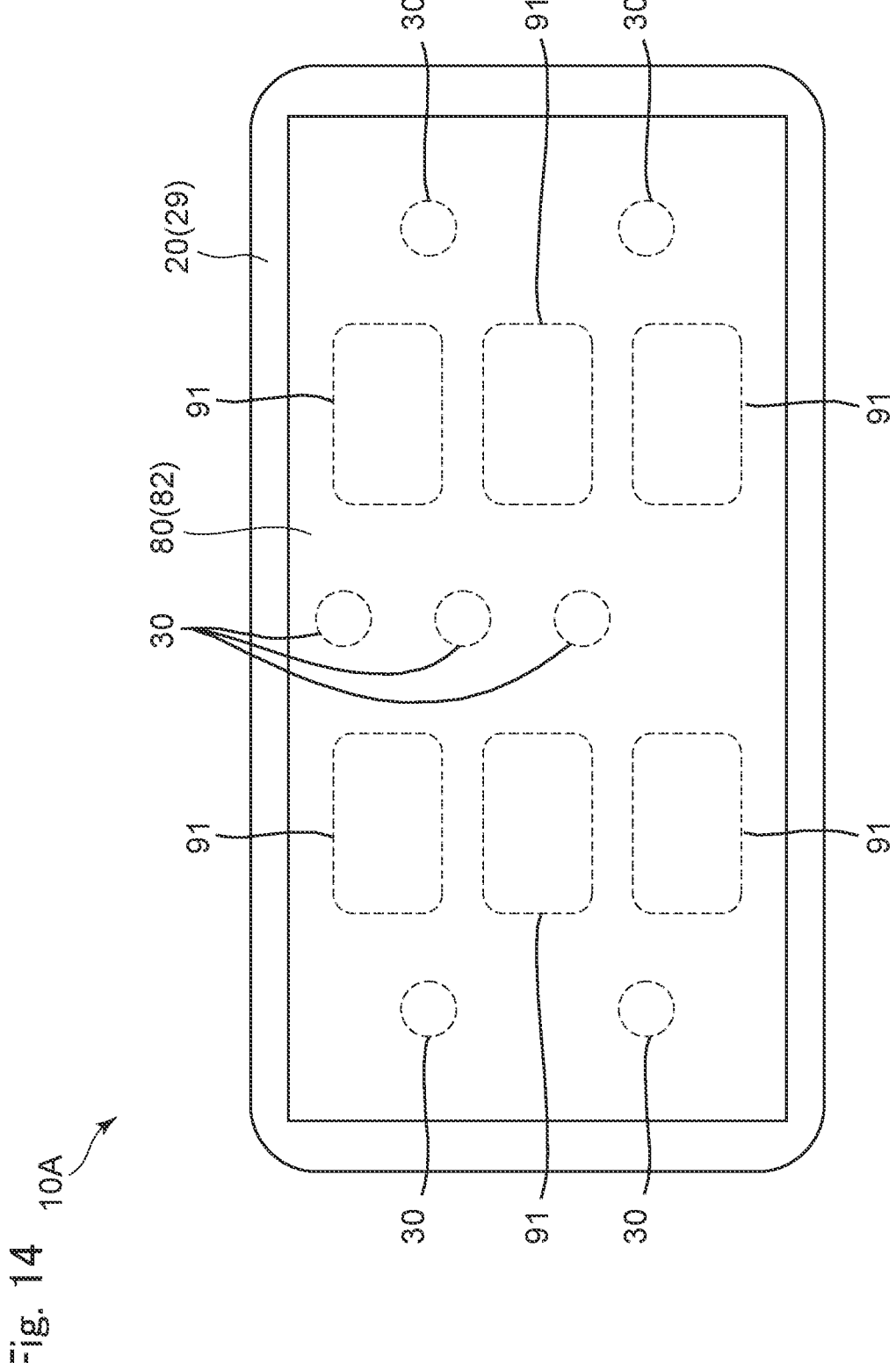
FIG. 14 is a plan view of an electronic component according to the modification of the first embodiment of the present disclosure.

Furthermore, as another example, three or more interlayer-connection conductors 30 may be provided in the substrate 29 on which the shield conductor 60 is formed, and the shield conductor 60 may be electrically connected to the ground via the three or more interlayer-connection conductors 30, as shown in FIG. 14. FIG. 14 is a plan view of an electronic component according to another modification of the first embodiment of the present disclosure.

This electronic component 10A shown in FIG. 14 includes six LC resonators 91. In addition, seven interlayer-connection conductors 30 are provided in the substrate 29 of the electronic component 10A, as indicated by the broken lines in FIG. 14. The shield conductor 60 is electrically connected to the seven interlayer-connection conductors 30. The seven interlayer-connection conductors 30 are electrically connected to the external electrode 51 that is electrically connected to the ground via at least one of the internal electrode 40 and another interlayer-connection conductors 30. That is, in the electronic component 10A shown in FIG. 14, the shield conductor 60 is electrically connected to the ground via the seven interlayer-connection conductors 30.

Second Embodiment

Figure 15:
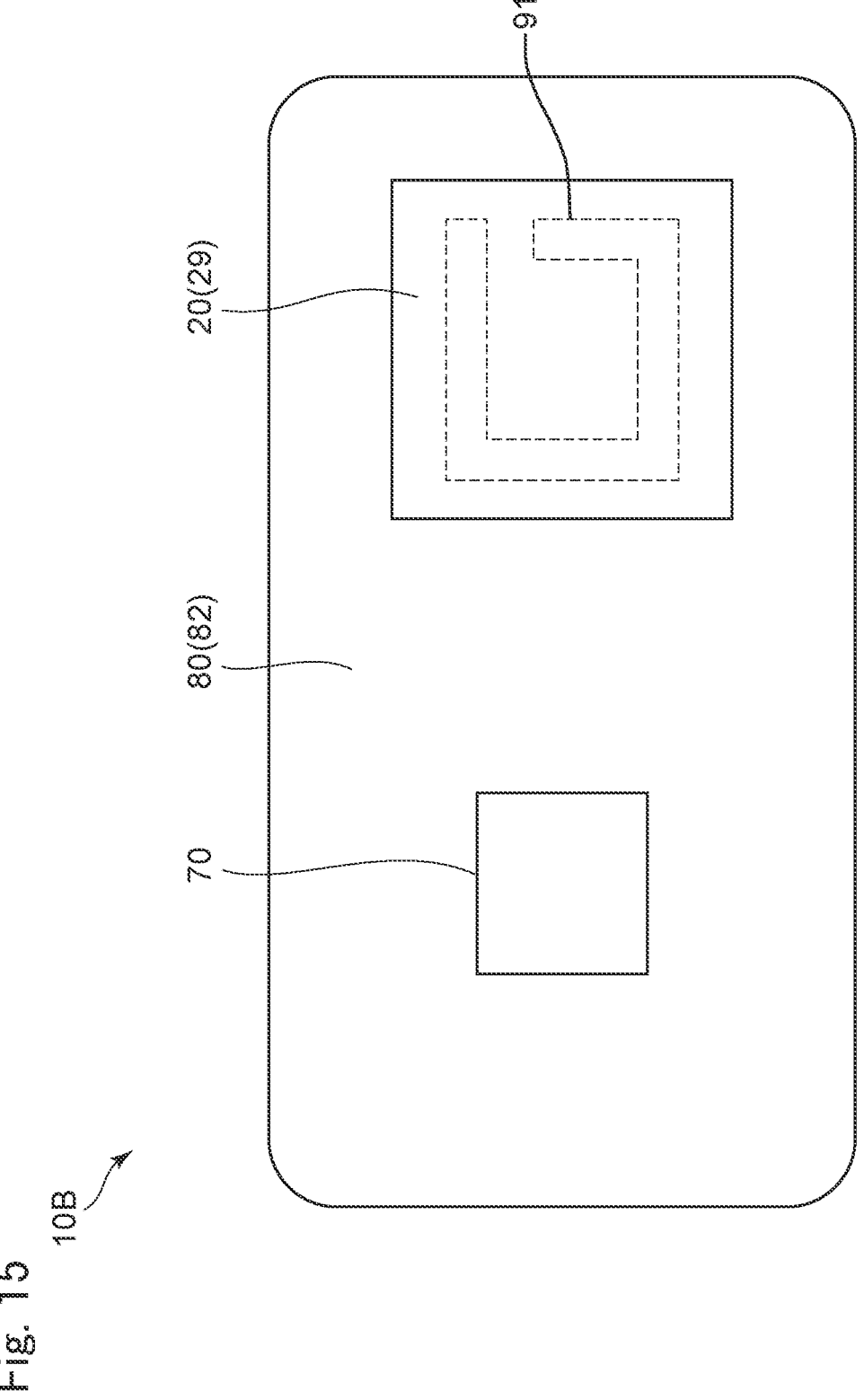
FIG. 15 is a plan view of an electronic component according to a second embodiment of the present disclosure.

FIG. 15 is a plan view of an electronic component according to a second embodiment of the present disclosure. This electronic component 10B according to the second embodiment is different from the electronic component 10 according to the first embodiment in that a part of the shield conductor 60 immediately above the LC resonator 91 is not covered by the plating layer 80. Hereinafter, the difference with respect to the first embodiment will be described. The parts that are the same as those in the electronic component 10 according to the first embodiment are denoted by the same reference numerals, and the description thereof will be basically omitted, and described as necessary.

As shown in FIG. 15, in the electronic component 10B, the shield conductor 60 and the plating layer 80 covering the shield conductor 60 are not formed in some area of the central part of the principal surface 20B of the substrate body 20, in a view from the thickness direction 100. Therefore, in a view from the thickness direction 100, the substrate 29 is exposed inside these areas. In a view from the thickness direction 100, this inner area is at a position overlapping with the LC resonator 91, which is provided internal of the substrate body 20.

According to the second embodiment, the area where the substrate 29 is exposed, without the shield conductor 60, in a view from the thickness direction 100, is at a position overlapping with the LC resonator 91 provided internal of the substrate body 20, in a view from the thickness direction 100. Therefore, it is possible to reduce the magnetic flux shielded by the shield conductor 60, among the magnetic flux extending from the LC resonator 91 to the principal surface 20B of the substrate body 20.

Third Embodiment

Figure 16:
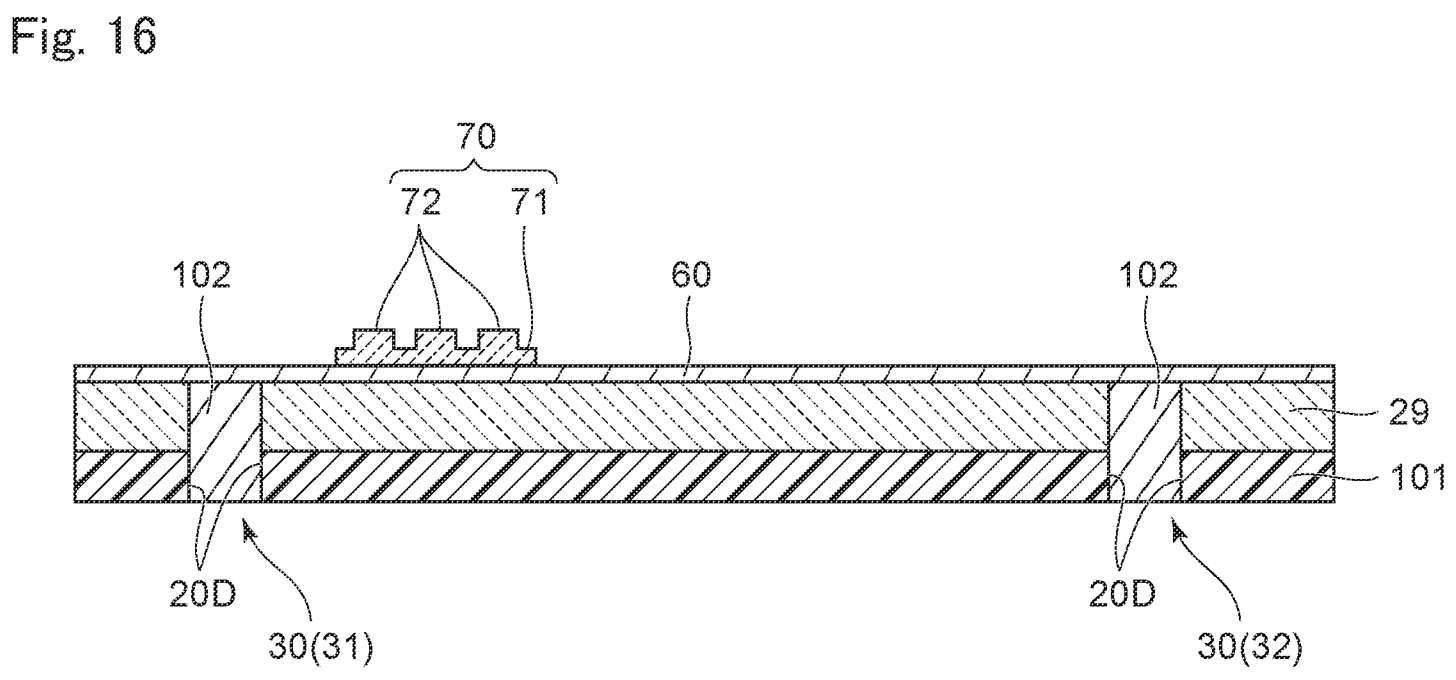
Figure 17:
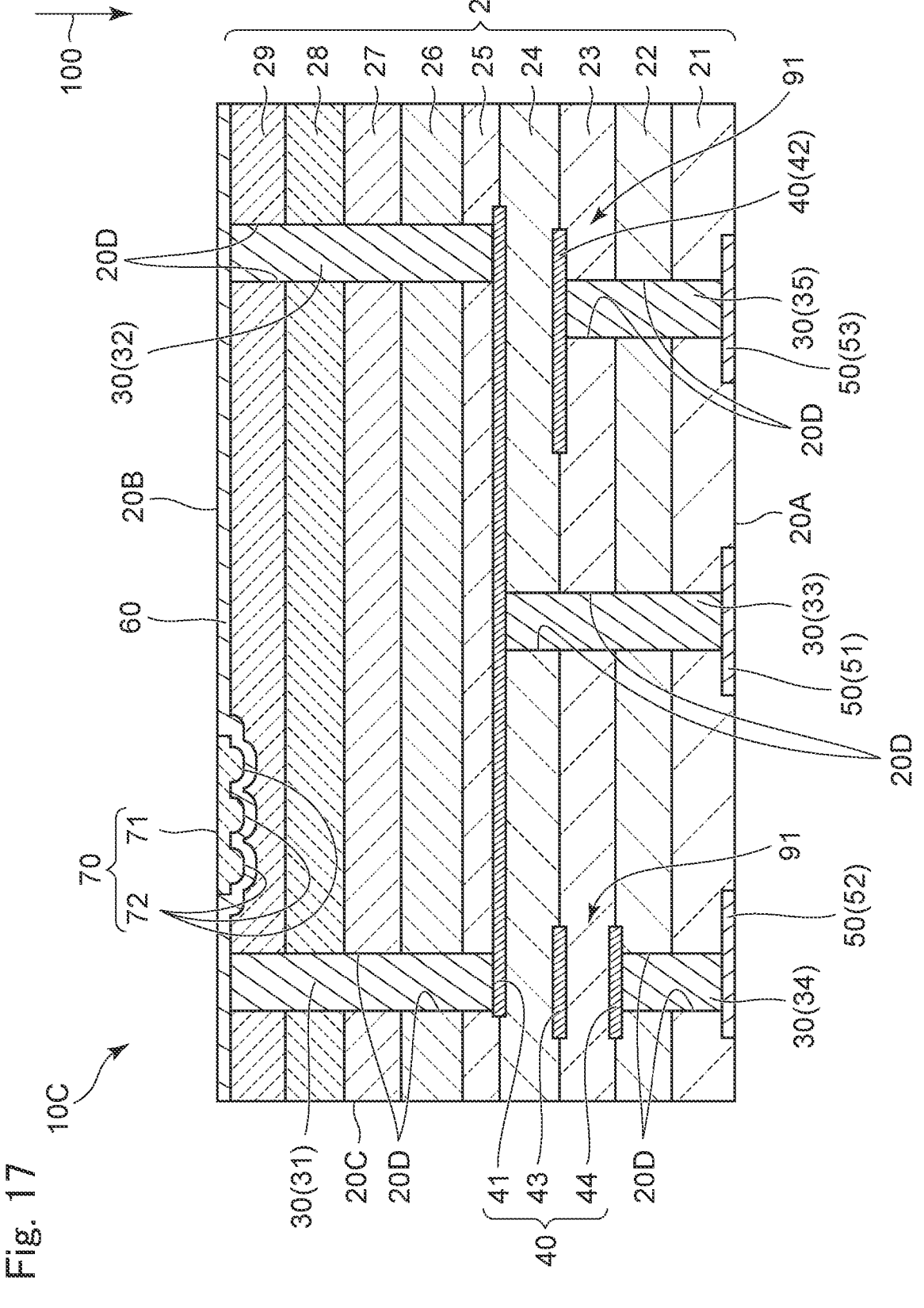
FIG. 17 is a cross-sectional view of the substrate body resultant of laminating, in the process of manufacturing the electronic component according to the third embodiment of the present disclosure.

FIG. 16 is a cross-sectional view when an identification mark is printed on the shield conductor, in the process of manufacturing the electronic component according to a third embodiment of the present disclosure. FIG. 17 is a cross-sectional view of the substrate body resultant of laminating, in the process of manufacturing the electronic component according to the third embodiment of the present disclosure. The electronic component 10C according to the third embodiment is characterized in that protrusions and recesses are formed on the interface between the identification mark 70 and the shield conductor 60. This characteristic of the third embodiment will be described below. The parts that are the same as those in the electronic component 10 according to the first embodiment are denoted by the same reference numerals, and the description thereof will be basically omitted, and described as necessary.

As shown in FIG. 17, the identification mark 70 of the electronic component 10C includes a film-like film portion 71 and projections 72 protruding from the film portion 71.

The film portion 71 is exposed to the external of this electronic component 10C. With this, the film portion 71 indicates the orientation and direction of the electronic component 10.

The projections 72 are provided on a surface of the film portion 71 on the side facing the substrate 29, in a manner protruding from the film portion 71 into the substrate 29. The projections 72 are infixed in the shield conductor 60. In the manner described above, protrusions and recesses are formed on the interface between the identification mark 70 and the shield conductor 60. As a result, adhesiveness between the identification mark 70 and the shield conductor 60 can be enhanced.

The parts of the shield conductor 60 having the projections 72 infixed in the shield conductor 60 rest deeper in the substrate 29, than the part of the shield conductor 60 without the projections 72. The interface between the shield conductor 60 and the substrate 29 therefore has protrusions and recesses formed thereon. As a result, adhesiveness between the shield conductor 60 and the substrate 29 can be enhanced.

Note that the position, the size, and the number of the projections 72 are not limited to the position, the size, and the number shown in FIG. 17. When the identification mark 70 has a plurality of projections 72, the sizes of the projections 72 may be the same or different from one another.

The identification mark 70 including the film portion 71 and the projections 72 is formed in the following manner, for example.

In the identification mark formation step, paste corresponding to the identification mark 70 is applied a plurality of number of times. For example, in the first run of paste printing, the film portions 71 is formed. Subsequently, in the second run of paste printing, the projections 72 are formed. The projections 72 are formed on the surface of the film portion 71 (a surface of the film portion 71, on the side facing the opposite side of the shield conductor 60). The position, the size, and the number of the projections 72 are set appropriately.

In the subsequent lamination step, the identification mark 70 is infixed into the shield conductor 60. At this time, the parts of the identification mark 70 with the projections 72 go deeper into the shield conductor 60 than the parts of the identification mark 70 without the projections 72. As a result, as shown in FIG. 17, the projections 72 become displaced from the surface of the film portion 71 on the opposite side of the substrate 29 to the surface of the film portion 71 on the side facing the substrate 29.

Described with reference to FIGS. 16 and 17 is a configuration in which the identification mark 70 includes projections 72, and therefore, protrusions and recesses are formed on the interface between the identification mark 70 and the shield conductor 60. However, it is also possible to achieve a configuration with protrusions and recesses on the interface between the identification mark 70 and the shield conductor 60, using a configuration other than the configuration including the projections 72.

Figure 18:
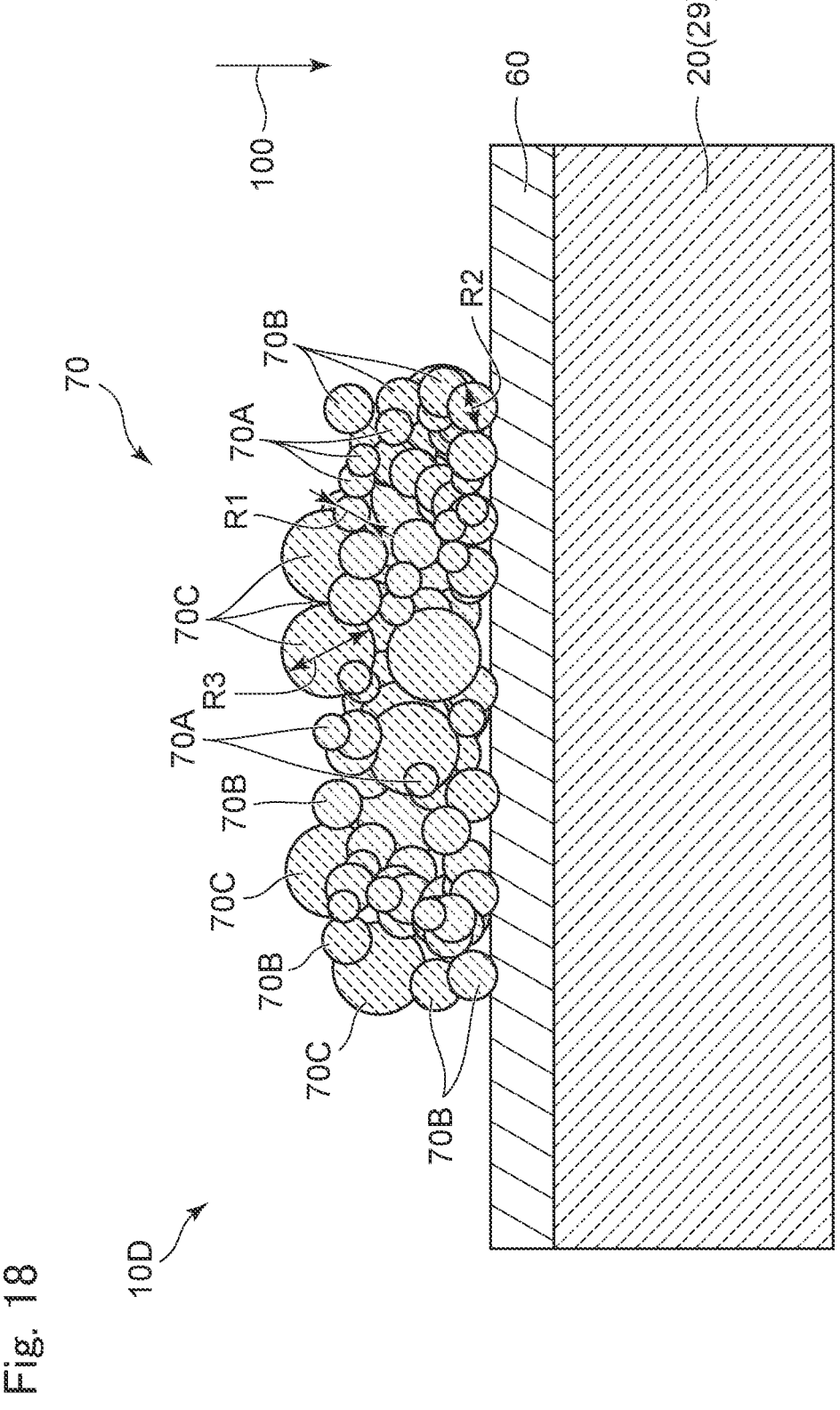
FIG. 18 is a cross-sectional view of a part of the substrate body resultant of printing an identification mark on the shield conductor, in the process of manufacturing the electronic component according to a modification of the third embodiment of the present disclosure.
Figure 19:
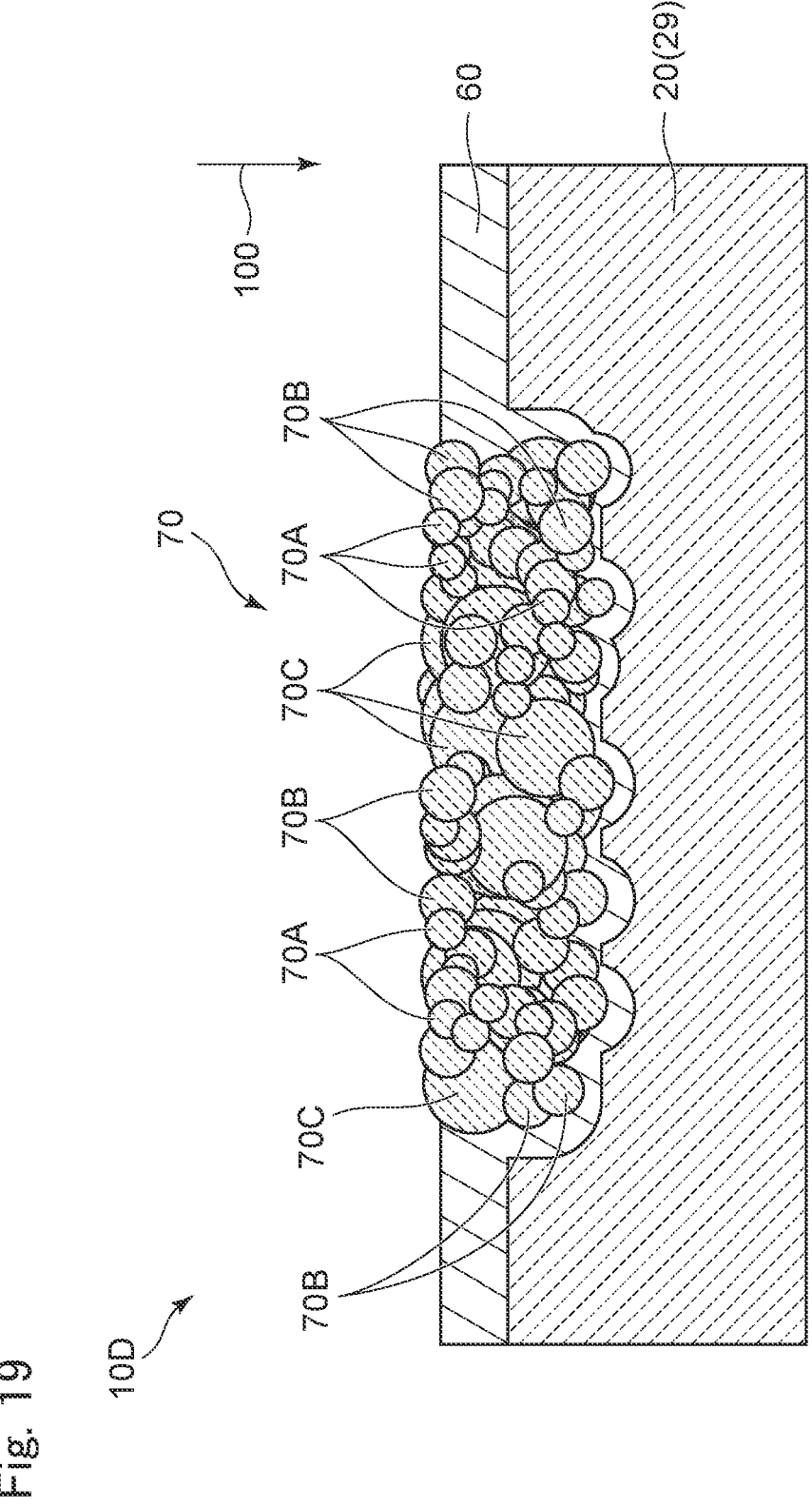
FIG. 19 is a cross-sectional view showing a part of the substrate body resultant of laminating, in the process of manufacturing the electronic component according to the modification of the third embodiment of the present disclosure.

For example, as shown in FIGS. 18 and 19, the identification mark 70 of an electronic component 10D may contain a plurality of types of powders having different sizes. FIG. 18 is a cross-sectional view of a part of the substrate body resultant of printing an identification mark on the shield conductor, in the process of manufacturing the electronic component according to a modification of the third embodiment of the present disclosure. FIG. 19 is a cross-sectional view showing a part of the substrate body resultant of laminating, in the process of manufacturing the electronic component according to the modification of the third embodiment of the present disclosure.

As shown in FIG. 19, the identification mark 70 includes three types of powders 70A, 70B, and 70C having different diameters. In other words, the identification mark 70 includes the powder 70A having a particle size R1, the powder 70B having a particle size R2, and the powder 70C having a particle size R3. The particle size R2 is larger than the particle size R1. The particle size R3 is larger than the particle size R2. When the powder 70B corresponds to a second powder, and the particle size R2 corresponds to a second particle size, the powder 70A corresponds to a first powder and the particle size R1 corresponds to a first particle size. When the powder 70C corresponds to the second powder and the particle size R3 corresponds to the second particle size, the powder 70A or the powder 70B corresponds to the first powder, and the particle size R1 or the particle size R2 corresponds to the first particle size.

Because these three types of powders 70A, 70B, and 70C having different particle sizes are irregularly mixed in the identification mark 70, protrusions and recesses are formed on the surface of the identification mark 70. As a result, adhesiveness between the identification mark 70 and the shield conductor 60 can be enhanced.

By infixing the identification mark 70 including the powders 70A, 70B, and 70C into the shield conductor 60, protrusions and recesses are formed on the interface between the shield conductor 60 and the substrate 29. As a result, adhesiveness between the shield conductor 60 and the substrate 29 can be enhanced.

With the configuration illustrated in FIG. 19, the identification mark 70 is more likely to have protrusions and recesses on the surface than the identification mark 70 only containing the powders of the same particle diameter.

Note that the number of types of powder included in the identification mark 70 is not limited to three. The identification mark 70 may include at least two types of powders.

The identification mark 70 including the three types of powders 70A, 70B, and 70C is formed in the same manner as in the first embodiment. However, in the identification mark formation step, the three types of powders 70A, 70B, and 70C are included in the paste corresponding to the identification mark 70 formed on the shield conductor 60 provided on the principal surface 20B (see FIG. 18). In the subsequent lamination step, the identification mark 70 including the three types of powders 70A, 70B, and 70C are infixed into the shield conductor 60 (see FIG. 19).

When the stacked substrates 21 to 29 is laminated in the manufacturing process of the electronic component 10C, 10D, the protrusions and recesses on the surface of the identification mark 70 are infixed into the shield conductor 60. As a result, adhesiveness between the identification mark 70 and the shield conductor 60 is enhanced. Furthermore, as the protrusions and the recesses on the surface of the identification mark 70 are infixed into the shield conductor 60, protrusions and recesses are formed on the surface of the shield conductor 60. By infixing the protrusions and the recesses on the surface of the shield conductor 60 into the substrate body, adhesiveness between the shield conductor 60 and the substrate body 20 is enhanced. As described above, according to the third embodiment, the adhesiveness between the identification mark 70 and the shield conductor 60 and the adhesiveness between the shield conductor 60 and the substrate body 20 can be improved.

Note that by using an appropriate combination of any of the various embodiments described above, it is possible to achieve the advantageous effects corresponding to the combined embodiments.

Although the present disclosure has been fully described in connection with the preferred embodiments thereof with reference to the drawings as appropriate, it is to be noted that various changes and modifications are apparent to those skilled in the art. Such variations and modifications are to be understood as falling within the scope of the present disclosure, as set forth in the appended claims.

10 electronic component
20 substrate body
20A principal surface
20B principal surface
20C side surface
21 substrate
22 substrate
23 substrate
24 substrate
25 substrate
26 substrate
27 substrate
28 substrate
29 substrate
30 interlayer-connection conductor
42 internal electrode (inductor conductor)
43 internal electrode (capacitor conductor)
44 internal electrode (capacitor conductor)

60 shield conductor
70 identification mark
70A powder (first powder)
70B powder (second powder)
91 LC resonator
100 thickness direction
R1 particle size (first particle size)
R2 particle size (second particle size)

What is claimed is:

1. An electronic component comprising:
   a substrate body including a plurality of insulating substrates laminated in a thickness direction and having a pair of principal surfaces facing each other and a side surface connecting the pair of principal surfaces;
   an LC resonator including an inductor conductor disposed on at least one of the plurality of substrates, and a capacitor conductor disposed on at least one of the plurality of substrates and electrically connected to the inductor conductor;
   a shield conductor disposed on at least one of the pair of principal surfaces, and electrically connected to a ground; and
   an identification mark provided on a surface of the shield conductor disposed on the one principal surface, among the pair of principal surfaces, wherein
   at least one of (i) a surface of the identification mark facing the shield conductor and (ii) a surface of the shield conductor facing the identification mark includes protrusions and recesses.

2. The electronic component according to claim 1, further comprising:
   at least one interlayer-connection conductor provided in a substrate among the plurality of insulating substrates having the shield conductor formed thereon, and penetrating the substrate, wherein
   the shield conductor is electrically connected to a ground via the interlayer-connection conductor.

3. The electronic component according to claim 2, wherein
   the at least one interlayer-connection conductor comprises a plurality of interlayer-connection conductors, and wherein
   the shield conductor is electrically connected to a ground via the plurality of interlayer-connection conductors.

4. The electronic component according to claim 3, wherein
   the identification mark is provided at a position offset from the interlayer-connection conductor, in a view from the thickness direction.

5. The electronic component according to claim 3, wherein
   the shield conductor is provided on one of the pair of principal surfaces, without providing the shield conductor on another one of the pair of principal surfaces and the side surfaces.

6. The electronic component according to claim 3, wherein
   the identification mark comprises a nonmetallic material.

7. The electronic component according to claim 2, wherein
   the identification mark is provided at a position offset from the interlayer-connection conductor, in a view from the thickness direction.

8. The electronic component according to claim 3, wherein
   the identification mark comprises at least a first powder having a first particle size and a second powder having a second particle size, and wherein the second particle size is larger than the first particle size.

9. The electronic component according to claim 7, wherein the identification mark comprises a nonmetallic material.

10. The electronic component according to claim 7, wherein the shield conductor is provided on one of the pair of principal surfaces, without providing the shield conductor on another one of the pair of principal surfaces and the side surfaces.

11. The electronic component according to claim 7, wherein the identification mark comprises at least a first powder having a first particle size and a second powder having a second particle size, and wherein the second particle size is larger than the first particle size.

12. The electronic component according to claim 2, wherein the shield conductor is provided on one of the pair of principal surfaces, without providing the shield conductor on another one of the pair of principal surfaces and the side surfaces.

13. The electronic component according to claim 2, wherein the identification mark comprises a nonmetallic material.

14. The electronic component according to claim 2, wherein the identification mark comprises at least a first powder having a first particle size and a second powder having a second particle size, and wherein the second particle size is larger than the first particle size.

15. The electronic component according to claim 1, wherein the shield conductor is provided on one of the pair of principal surfaces, without providing the shield conductor on another one of the pair of principal surfaces and the side surfaces.

16. The electronic component according to claim 15, wherein the identification mark comprises a nonmetallic material.

17. The electronic component according to claim 15, wherein the identification mark comprises at least a first powder having a first particle size and a second powder having a second particle size, and wherein the second particle size is larger than the first particle size.

18. The electronic component according to claim 1, wherein the identification mark comprises a nonmetallic material.

19. The electronic component according to claim 18, wherein the identification mark comprises at least a first powder having a first particle size and a second powder having a second particle size, and wherein the second particle size is larger than the first particle size.

20. The electronic component according to claim 1, wherein the identification mark comprises at least a first powder having a first particle size and a second powder having a second particle size, and wherein the second particle size is larger than the first particle size.

\* \* \* \* \*